US012768971B2

(12) United States Patent
Lin et al.

(10) Patent No.: US 12,768,971 B2
(45) Date of Patent: Oct. 20, 2026

(54) MANUFACTURING PROCESS FOR SEMICONDUCTOR-BASED LIDAR SENSOR SYSTEM WITH IMPROVED OPTICAL ALIGNMENT

(71) Applicant: Aurora Operations, Inc., Pittsburgh, PA (US)

(72) Inventors: Sen Lin, Mountain View, CA (US); Andrew Steil Michaels, Los Altos, CA (US)

(73) Assignee: AURORA OPERATIONS, INC., Pittsburgh, PA (US)

( * ) Notice: Subject to any disclaimer, the term of this patent is extended or adjusted under 35 U.S.C. 154(b) by 169 days.

(21) Appl. No.: 18/905,577

(22) Filed: Oct. 3, 2024

(65) Prior Publication Data

US 2026/0098949 A1 Apr. 9, 2026

(51) Int. Cl.

| | |
|---|---|
| ***G01S 7/497*** | (2006.01) |
| ***G01S 7/481*** | (2006.01) |
| ***G01S 17/931*** | (2020.01) |

(52) U.S. Cl.

CPC .......... *G01S 7/4972* (2013.01); *G01S 7/4816* (2013.01); *G01S 17/931* (2020.01)

(58) Field of Classification Search

None

See application file for complete search history.

(56) References Cited

U.S. PATENT DOCUMENTS

| | | | | |
|---|---|---|---|---|
| 2006/0201547 | A1* | 9/2006 | Rogers | H02S 99/00 136/201 |
| 2018/0372853 | A1* | 12/2018 | Droz | G01S 17/89 |
| 2020/0201031 | A1 | 6/2020 | Holleczek et al. | |
| 2023/0251359 | A1 | 8/2023 | Michaels et al. | |

(Continued)

FOREIGN PATENT DOCUMENTS

| | | |
|---|---|---|
| KR | 2020-0139964 | 12/2020 |
| KR | 20200139964 A | 12/2020 |

(Continued)

OTHER PUBLICATIONS

Xu, W., Yuan, Q., Yang, Y et al. Progress and prospects for LiDAR-oriented optical phased arrays based on photonic integrated circuits. npj Nanophoton. 2, 14 (2025) (Year: 2025).*

(Continued)

*Primary Examiner* — Isam A Alsomiri
*Assistant Examiner* — Joseph C Fritchman
(74) *Attorney, Agent, or Firm* — Dority & Manning, P.A.

(57) ABSTRACT

A method for manufacturing a semiconductor-based LIDAR sensor system for a vehicle, includes: providing a semiconductor optical device in a first alignment position within the LIDAR sensor system; obtaining an interference pattern associated with a first light beam that passes through the semiconductor optical device at a first location and a second light beam that passes through the semiconductor optical device at a second location; determining a position of the first location relative to the second location based on the interference pattern; and aligning the semiconductor optical (Continued)

device in a second alignment position within the LIDAR sensor system, based on the position of the first location relative to the second location.

21 Claims, 18 Drawing Sheets

(56) References Cited

U.S. PATENT DOCUMENTS

| | | | | |
|---|---|---|---|---|
| 2024/0380176 | A1* | 11/2024 | Yoshida | H01S 5/2205 |
| 2025/0173415 | A1* | 5/2025 | Maizels | H04R 1/028 |

FOREIGN PATENT DOCUMENTS

| | | |
|---|---|---|
| KR | 2021-0063250 | 6/2021 |
| KR | 20210063250 A | 6/2021 |

OTHER PUBLICATIONS

International Search Report and Written Opinion for PCT/US2025/049305 mailed on Feb. 2, 2026, 10 pages.

International Search Report and Written Opinion for PCT/US2025/049305 mailed on Feb. 2, 2026, 10 pages. [Previously submitted with the Information Disclosure Statement of Feb. 17, 2026.].

* cited by examiner

1200

MANUFACTURING PROCESS FOR SEMICONDUCTOR-BASED LIDAR SENSOR SYSTEM WITH IMPROVED OPTICAL ALIGNMENT

BACKGROUND

Light Detection and Ranging (LIDAR) systems use lasers to create three-dimensional representations of surrounding environments. A LIDAR system includes at least one emitter paired with a receiver to form a channel, though an array of channels may be used to expand the field of view of the LIDAR system. During operation, each channel emits a laser beam into the environment. The laser beam reflects off of an object within the surrounding environment, and the reflected laser beam is detected by the receiver. A single channel provides a single point of ranging information. Collectively, channels are combined to create a point cloud that corresponds to a three-dimensional representation of the surrounding environment.

The emitter and/or receiver often includes photonic circuitry formed on a semiconductor substrate such as a silicon die. Silicon photonics dies can provide for precise formation of the photonic circuitry through, for example, photolithography. Other optical components of a LIDAR sensor system may also be formed on semiconductor substrates, while still others are formed on or connected to components made using other semiconductor materials such as, for example, a group III-V semiconductor, gallium arsenide (GaAs), and/or other suitable materials.

SUMMARY

Aspects and advantages of implementations of the disclosure will be set forth in part in the following description, or may be learned from the description, or may be learned through practice of the implementations.

Example aspects of the disclosure relate to methods of manufacturing a semiconductor-based LIDAR sensor system for a vehicle, the LIDAR sensor system having one or more semiconductor optical devices which may be part of a semiconductor optical system (e.g., a semiconductor optical assembly, a photonics module, etc.).

Tolerance requirements for some semiconductor optical devices in a LIDAR sensor system may be very tight (e.g., less than ten μm, less than five μm, less than one μm, etc.). For example, a manufacturing specification may specify that a transmitted light beam and a received light beam for an optical component be separated by a predetermined distance (e.g., by 100 μm). However, ensuring this level of manufacturing tolerance as well as alignment precision can be very challenging.

According to examples of the disclosure, a method for manufacturing a semiconductor-based LIDAR sensor system for a vehicle includes aligning one or more semiconductor optical devices within the LIDAR sensor system. For example, the one or more semiconductor optical devices may be aligned based on an interference pattern associated with light beams that pass through the one or more semiconductor optical devices. In some implementations, the interference pattern may be generated via an image sensor. For example, the image sensor may be disposed a predetermined distance from a semiconductor optical device (e.g., about 50 mm, about 100 mm, about 200 mm, etc.). For example, the disclosed method may be implemented to align the semiconductor optical device such that a distance between a first light beam and a second light beam is within a predetermined tolerance (e.g., within about ±10 μm, within about ±5 μm, within about ±1 μm, etc.). In some implementations, the first and second light beams are coherent with each other. In some implementations, the first and second light beams are generated from the same light source (e.g., the same laser).

The one or more semiconductor optical devices may be included in a semiconductor optical system (e.g., a semiconductor optical assembly, a photonics module, etc.). In some implementations, the interference pattern may include a plurality of fringes whose separation depends (e.g., directly) on the relative positioning of the first and second light beams associated with the semiconductor optical device.

In some implementations, an optical measurement device may be configured to analyze or measure characteristics of a light beam (e.g., laser beam) associated with the semiconductor optical device. For example, the optical measurement device may include an image sensor (e.g., a scanning slit beam profiler). In some implementations, the optical measurement device may be configured to measure an intensity (e.g., a spatial intensity distribution) of the light beam. For example, the optical measurement device may be configured to provide a cross-sectional view of the light beam's profile (e.g., in a horizontal or x-direction and/or in a vertical or y-direction). Characteristics of the light beam may include a beam width, divergence characteristics, asymmetries, and an overall spatial profile.

In some implementations, the optical measurement device may be configured to output information relating to the interference pattern which can be used to determine a relative positioning between a first location of the semiconductor optical device and a second location of the semiconductor optical device. The first location is associated with the first light beam and the second location is associated with the second light beam. For example, the method may include determining or measuring an interference fringe spacing associated with an interference pattern which can be used to determine the relative positioning of the first location relative to the second location, based on the interference pattern. The first light beam passes through the semiconductor optical device at the first location and the second light beam passes through the semiconductor optical device at the second location.

Example aspects of the disclosure are directed to LIDAR systems for autonomous vehicles. As further described herein, the LIDAR systems can be used by various devices and platforms (e.g., robotic platforms, etc.) to improve the ability of the devices and platforms to perceive their environment and perform functions in response thereto (e.g., autonomously navigating through the environment).

An autonomous vehicle (AV) can include a LIDAR system to assist the AV in perceiving its environment and navigating its environment. The LIDAR system can include a transceiver having a transmitter and receiver. The transmitter can condition a light beam (e.g., a laser beam) to be emitted by the LIDAR system into its environment. Similarly, the receiver can provide for receiving the light beam after it is emitted into the environment of the LIDAR system and reflected by objects in the environment. The receiver can provide the received beam to downstream components of the LIDAR system for processing, which can provide for the AV to perceive its environment. Because of the correlation between the transmitted beam and received beam, the transmitter and receiver may generally be placed in a tightly controlled positional relationship. For instance, the portion of the transmitter that emits the beam can be positioned near the portion of the receiver that receives the beam. In addition, some LIDAR systems such as coherent LIDAR systems can utilize a reference signal, such as a local oscillator (LO) signal, which passes from the transmitter to receiver without being emitted into the environment of the LIDAR system. For instance, this reference signal may be combined with the received beam to denoise or otherwise process the received beam to extract useful information. For instance, the LIDAR system can determine a distance to the object and/or velocity of the object based on the reflected beam.

The disclosure provides an improved LIDAR system, such as a coherent LIDAR system, which includes components which are properly aligned or positioned according to specification or tolerance requirements.

An alignment system and a LIDAR system according to the disclosure can provide numerous technical effects and benefits. For example, an alignment method implemented by an alignment system as described herein can ensure that a semiconductor optical device has been manufactured according to specifications and is positioned within a LIDAR system (e.g. LIDAR sensor system) according to design or specification requirements. The disclosed alignment method can also be implemented to provide active feedback (e.g., in real-time) for aligning the semiconductor optical device in the semiconductor optical system.

For instance, the LIDAR systems manufactured according to the disclosure can provide improved accuracy of object detections through properly aligned components (e.g., a properly aligned semiconductor optical device) that result in light beams which are transmitted and received with an appropriate separation distance. In addition, when a plurality of semiconductor optical devices are provided, the semiconductor optical devices can be aligned or positioned with respect to one another according to the methods described herein, thereby improving the quality of the LIDAR system (e.g., LIDAR sensor system). In this manner, LIDAR systems according to the disclosure can provide improved performance compared to some existing LIDAR systems.

Example aspects of the disclosure provide an example method for manufacturing a semiconductor-based LIDAR sensor system for a vehicle. The example method includes providing a semiconductor optical device in a first alignment position within the LIDAR sensor system; obtaining an interference pattern associated with a first light beam that passes through the semiconductor optical device at a first location and a second light beam that passes through the semiconductor optical device at a second location; determining a position of the first location relative to the second location based on the interference pattern; and aligning the semiconductor optical device in a second alignment position within the LIDAR sensor system, based on the position of the first location relative to the second location.

In some implementations, the interference pattern is indicative of an intensity of interference between the first light beam and the second light beam as the first light beam and the second light beam propagate.

In some implementations, determining the position of the first location relative to the second location based on the interference pattern comprises: determining, based on the interference pattern, a distance between the first light beam and the second light beam.

In some implementations, the interference pattern includes a plurality of fringes, and determining, based on the interference pattern, the distance between the first light beam and the second light beam, comprises: determining a spacing between peaks of fringes among the plurality of fringes, wherein the distance between the first light beam and the second light beam is a function of the spacing between the peaks of the fringes.

In some implementations, the distance between the first light beam and the second light beam is between about 10 μm to about 1 mm.

In some implementations, determining the position of the first location relative to the second location based on the interference pattern comprises: determining, based on the interference pattern, a relative angle between the first light beam and the second light beam.

In some implementations, the interference pattern includes a plurality of fringes, and determining, based on the interference pattern, a distance between the first light beam and the second light beam by determining a spacing between peaks of fringes among the plurality of fringes, wherein the distance between the first light beam and the second light beam is a function of the spacing between the peaks of the fringes and the relative angle between the first light beam and the second light beam.

In some implementations, determining the position of the first location relative to the second location based on the interference pattern comprises: determining a distance between a beam waist associated with one of the first light beam and the second light beam and a focal plane of an image sensor to which the first light beam and the second light beam are directed.

In some implementations, the interference pattern includes a plurality of fringes, and determining, based on the interference pattern, the distance between the first light beam and the second light beam, comprises: determining a spacing between peaks of fringes among the plurality of fringes, wherein the distance between the first light beam and the second light beam is a function of the spacing between the peaks of the fringes and the distance between the beam waist and the focal plane of the image sensor.

In some implementations, the first alignment position and the second alignment position of the semiconductor optical device are different; and aligning the semiconductor optical device in the second alignment position based on the position of the first location relative to the second location comprises implementing an alignment system to orient the semiconductor optical device until the position of the first location relative to the second location is within a threshold tolerance range of a particular distance between the first location and the second location.

In some implementations, the first alignment position and the second alignment position of the semiconductor optical device are substantially the same; and aligning the semiconductor optical device in the second alignment position comprises determining that a distance between the first location and the second location is within a particular threshold value of a particular target distance.

In some implementations, the semiconductor optical device includes a microlens array.

In some implementations, the microlens array includes a first portion and a second portion, the first portion includes a first mirror configured to reflect the first light beam in a first direction toward an environment of the vehicle, and the second portion includes a second mirror configured to reflect the second light beam in a second direction, different from the first direction, toward a receiver.

In some implementations, the first portion and the second portion are joined together at a third location between the first location and the second location, and the first mirror intersects with the second mirror at the third location to form a notch between the first portion and the second portion.

In some implementations, obtaining the interference pattern comprises: providing, at a particular distance away from the semiconductor optical device, an image sensor, controlling one or more light sources to emit the first light beam toward the image sensor, wherein the first light beam passes through the semiconductor optical device at the first location, and while the first light beam is being emitted, controlling the one or more light sources to emit the second light beam toward the image sensor, wherein the second light beam passes through the semiconductor optical device at the second location.

In some implementations, the first light beam and the second light beam are coherent.

In some implementations, the one or more light sources are integrated into the semiconductor-based LIDAR sensor system.

In some implementations, the method further includes: providing an additional semiconductor optical device for the LIDAR sensor system; obtaining an additional interference pattern associated with the first light beam that passes through the semiconductor optical device at the first location and a third light beam that passes through the additional semiconductor optical device at a third location; determining a position of the first location relative to the third location based on the additional interference pattern; and aligning the semiconductor optical device with the additional semiconductor optical device within the LIDAR sensor system, based on the position of the first location relative to the third location.

Example aspects of the disclosure provide an example alignment system for manufacturing a semiconductor-based LIDAR sensor system for a vehicle. The example alignment system includes a semiconductor optical device provided in a first alignment position within the LIDAR sensor system; a sensor configured to obtain an interference pattern associated with a first light beam that passes through the semiconductor optical device at a first location and a second light beam that passes through the semiconductor optical device at a second location, and to determine a position of the first location relative to the second location based on the interference pattern; and an alignment device configured to align the semiconductor optical device in a second alignment position within the LIDAR sensor system, based on the position of the first location relative to the second location.

In some implementations, the alignment device is configured to align the semiconductor optical device in the second alignment position based on the position of the first location relative to the second location by adjusting the semiconductor optical device until the position of the first location relative to the second location is within a threshold tolerance range of a particular distance between the first location and the second location.

In some implementations, a focal plane of the sensor is provided a particular distance from a focal plane of the semiconductor optical device, and the alignment system further comprises one or more light sources configured to: emit the first light beam toward the sensor, wherein the first light beam passes through the semiconductor optical device at the first location, and while the first light beam is being emitted, emit the second light beam toward the sensor, wherein the second light beam passes through the semiconductor optical device at the second location.

Other example aspects of the disclosure are directed to other systems, methods, vehicles, apparatuses, tangible non-transitory computer-readable media, and devices for motion prediction and/or operation of a device including a LIDAR system having a LIDAR module according to example aspects of the disclosure.

These and other features, aspects and advantages of various implementations of the disclosure will become better understood with reference to the following description and appended claims. The accompanying drawings, which are incorporated in and constitute a part of this specification, illustrate implementations of the disclosure and, together with the description, serve to explain the related principles.

DETAILED DESCRIPTION

The following describes the technology of this disclosure within the context of a LIDAR system and an autonomous vehicle for example purposes only. As described herein, the technology is not limited to an autonomous vehicle and can be implemented within other robotic and computing systems as well as various devices. For example, the systems and methods disclosed herein can be implemented in a variety of ways including, but not limited to, a computer-implemented method, an autonomous vehicle system, an autonomous vehicle control system, a robotic platform system, a general robotic device control system, a computing device, etc.

Figure 1:
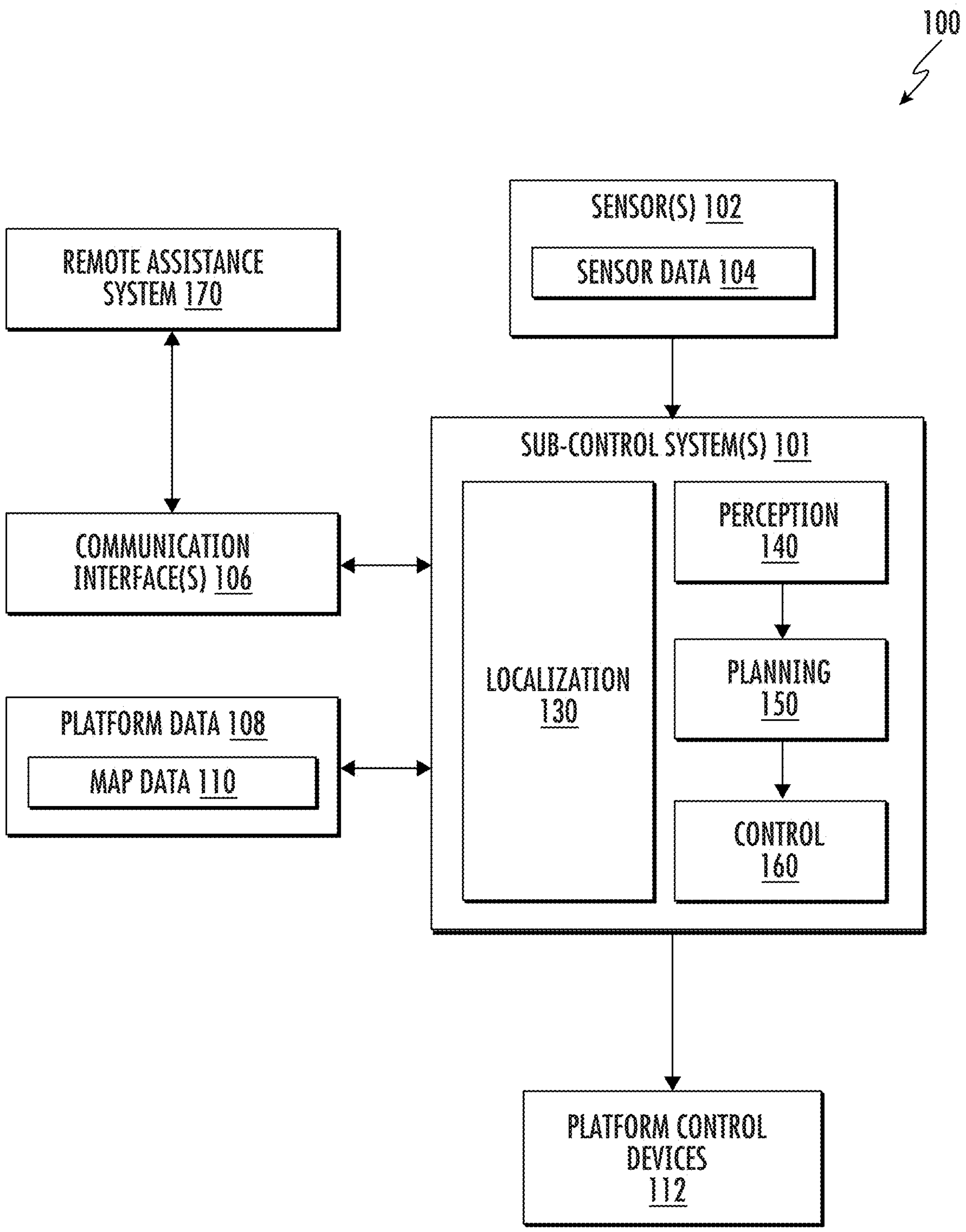
FIG. 1 is a block diagram of an example system according to some implementations of the disclosure.

With reference to FIGS. 1-16, example implementations of the disclosure are discussed in further detail. FIG. 1 depicts a block diagram of an example autonomous vehicle control system 100 for an autonomous vehicle according to some implementations of the disclosure. The autonomous vehicle control system 100 can be implemented by a computing system of an autonomous vehicle). The autonomous vehicle control system 100 can include one or more sub-control systems 101 that operate to obtain inputs from sensor(s) 102 or other input devices of the autonomous vehicle control system 100. In some implementations, the sub-control system(s) 101 can additionally obtain platform data 108 (e.g., map data 110) from local or remote storage. The sub-control system(s) 101 can generate control outputs for controlling the autonomous vehicle (e.g., through platform control devices 112, etc.) based on sensor data 104, map data 110, or other data. The sub-control system 101 may include different subsystems for performing various autonomy operations. The subsystems may include a localization system 130, a perception system 140, a planning system 150, and a control system 160. The localization system 130 can determine the location of the autonomous vehicle within its environment; the perception system 140 can detect, classify, and track objects and actors in the environment; the planning system 150 can determine a trajectory for the autonomous vehicle; and the control system 160 can translate the trajectory into vehicle controls for controlling the autonomous vehicle. The sub-control system(s) 101 can be implemented by one or more onboard computing system(s). The subsystems can include one or more processors and one or more memory devices. The one or more memory devices can store instructions executable by the one or more processors to cause the one or more processors to perform operations or functions associated with the subsystems. The computing resources of the sub-control system(s) 101 can be shared among its subsystems, or a subsystem can have a set of dedicated computing resources.

In some implementations, the autonomous vehicle control system 100 can be implemented for or by an autonomous vehicle (e.g., a ground-based autonomous vehicle). The autonomous vehicle control system 100 can perform various processing techniques on inputs (e.g., the sensor data 104, the map data 110) to perceive and understand the vehicle's surrounding environment and generate an appropriate set of control outputs to implement a vehicle motion plan (e.g., including one or more trajectories) for traversing the vehicle's surrounding environment. In some implementations, an autonomous vehicle implementing the autonomous vehicle control system 100 can drive, navigate, operate, etc. with minimal or no interaction from a human operator (e.g., driver, pilot, etc.).

In some implementations, the autonomous vehicle can be configured to operate in a plurality of operating modes. For instance, the autonomous vehicle can be configured to operate in a fully autonomous (e.g., self-driving, etc.) operating mode in which the autonomous platform is controllable without user input (e.g., can drive and navigate with no input from a human operator present in the autonomous vehicle or remote from the autonomous vehicle, etc.). The autonomous vehicle can operate in a semi-autonomous operating mode in which the autonomous vehicle can operate with some input from a human operator present in the autonomous vehicle (or a human operator that is remote from the autonomous platform). In some implementations, the autonomous vehicle can enter into a manual operating mode in which the autonomous vehicle is fully controllable by a human operator (e.g., human driver, etc.) and can be prohibited or disabled (e.g., temporary, permanently, etc.) from performing autonomous navigation (e.g., autonomous driving, etc.). The autonomous vehicle can be configured to operate in other modes such as, for example, park or sleep modes (e.g., for use between tasks such as waiting to provide a trip/service, recharging, etc.). In some implementations, the autonomous vehicle can implement vehicle operating assistance technology (e.g., collision mitigation system, power assist steering, etc.), for example, to help assist the human operator of the autonomous platform (e.g., while in a manual mode, etc.).

The autonomous vehicle control system 100 can be located onboard (e.g., on or within) an autonomous vehicle and can be configured to operate the autonomous vehicle in various environments. The environment may be a real-world environment or a simulated environment. In some implementations, one or more simulation computing devices can simulate one or more of: the sensors 102, the sensor data 104, communication interface(s) 106, the platform data 108, or the platform control devices 112 for simulating operation of the autonomous vehicle control system 100.

In some implementations, the sub-control system(s) 101 can communicate with one or more networks or other systems with communication interface(s) 106. The communication interface(s) 106 can include any suitable components for interfacing with one or more network(s), including, for example, transmitters, receivers, ports, controllers, antennas, or other suitable components that can help facilitate communication. In some implementations, the communication interface(s) 106 can include a plurality of components (e.g., antennas, transmitters, or receivers, etc.) that allow it to implement and utilize various communication techniques (e.g., multiple-input, multiple-output (MIMO) technology, etc.).

In some implementations, the sub-control system(s) 101 can use the communication interface(s) 106 to communicate with one or more computing devices that are remote from the autonomous vehicle over one or more network(s). For instance, in some examples, one or more inputs, data, or functionalities of the sub-control system(s) 101 can be supplemented or substituted by a remote system communicating over the communication interface(s) 106. For instance, in some implementations, the map data 110 can be downloaded over a network to a remote system using the communication interface(s) 106. In some examples, one or more of the localization system 130, the perception system 140, the planning system 150, or the control system 160 can be updated, influenced, nudged, communicated with, etc. by a remote system for assistance, maintenance, situational response override, management, etc.

The sensor(s) 102 can be located onboard the autonomous platform. In some implementations, the sensor(s) 102 can include one or more types of sensor(s). For instance, one or more sensors can include image capturing device(s) (e.g., visible spectrum cameras, infrared cameras, etc.). Additionally or alternatively, the sensor(s) 102 can include one or more depth capturing device(s). For example, the sensor(s) 102 can include one or more LIDAR sensor(s) or Radio Detection and Ranging (RADAR) sensor(s). The sensor(s) 102 can be configured to generate point data descriptive of at least a portion of a three-hundred-and-sixty-degree view of the surrounding environment. The point data can be point cloud data (e.g., three-dimensional LIDAR point cloud data, RADAR point cloud data). In some implementations, one or more of the sensor(s) 102 for capturing depth information can be fixed to a rotational device in order to rotate the sensor(s) 102 about an axis. The sensor(s) 102 can be rotated about the axis while capturing data in interval sector packets descriptive of different portions of a three-hundred-and-sixty-degree view of a surrounding environment of the autonomous platform. In some implementations, one or more of the sensor(s) 102 for capturing depth information can be solid state.

The sensor(s) 102 can be configured to capture the sensor data 104 indicating or otherwise being associated with at least a portion of the environment of the autonomous vehicle. The sensor data 104 can include image data (e.g., 2D camera data, video data, etc.), RADAR data, LIDAR data (e.g., 3D point cloud data, etc.), audio data, or other types of data. In some implementations, the sub-control system(s) 101 can obtain input from additional types of sensors, such as inertial measurement units (IMUs), altimeters, inclinometers, odometry devices, location or positioning devices (e.g., GPS, compass), wheel encoders, or other types of sensors. In some implementations, the sub-control system(s) 101 can obtain sensor data 104 associated with particular component(s) or system(s) of the autonomous vehicle. This sensor data 104 can indicate, for example, wheel speed, component temperatures, steering angle, cargo or passenger status, etc. In some implementations, the sub-control system(s) 101 can obtain sensor data 104 associated with ambient conditions, such as environmental or weather conditions. In some implementations, the sensor data 104 can include multi-modal sensor data. The multi-modal sensor data can be obtained by at least two different types of sensor(s) (e.g., of the sensors 102) and can indicate static and/or dynamic object(s) or actor(s) within an environment of the autonomous vehicle. The multi-modal sensor data can include at least two types of sensor data (e.g., camera and LIDAR data). In some implementations, the autonomous vehicle can utilize the sensor data 104 for sensors that are remote from (e.g., offboard) the autonomous vehicle. This can include for example, sensor data 104 captured by a different autonomous vehicle.

The sub-control system(s) 101 can obtain the map data 110 associated with an environment in which the autonomous vehicle was, is, or will be located. The map data 110 can provide information about an environment or a geographic area. For example, the map data 110 can provide information regarding the identity and location of different travel ways (e.g., roadways, etc.), travel way segments (e.g., road segments, etc.), buildings, or other items or objects (e.g., lampposts, crosswalks, curbs, etc.); the location and directions of boundaries or boundary markings (e.g., the location and direction of traffic lanes, parking lanes, turning lanes, bicycle lanes, other lanes, etc.); traffic control data (e.g., the location and instructions of signage, traffic lights, other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicating an ideal vehicle path such as along the center of a certain lane, etc.); or any other map data that provides information that assists an autonomous vehicle in understanding its surrounding environment and its relationship thereto. In some implementations, the map data 110 can include high-definition map information. Additionally, or alternatively, the map data 110 can include sparse map data (e.g., lane graphs, etc.). In some implementations, the sensor data 104 can be fused with or used to update the map data 110 in real time.

The sub-control system(s) 101 can include the localization system 130, which can provide an autonomous vehicle with an understanding of its location and orientation in an environment. In some examples, the localization system 130 can support one or more other subsystems of the sub-control system(s) 101, such as by providing a unified local reference frame for performing, e.g., perception operations, planning operations, or control operations.

In some implementations, the localization system 130 can determine the current position of the autonomous vehicle. A current position can include a global position (e.g., respecting a georeferenced anchor, etc.) or relative position (e.g., respecting objects in the environment, etc.). The localization system 130 can generally include or interface with any device or circuitry for analyzing a position or change in position of an autonomous vehicle. For example, the localization system 130 can determine position by using one or more of: inertial sensors (e.g., inertial measurement unit(s), etc.), a satellite positioning system, radio receivers, networking devices (e.g., based on IP address, etc.), triangulation or proximity to network access points or other network components (e.g., cellular towers, Wi-Fi access points, etc.), or other suitable techniques. The position of the autonomous vehicle can be used by various subsystems of the sub-control system(s) 101 or provided to a remote computing system (e.g., using the communication interface(s) 106).

In some implementations, the localization system 130 can register relative positions of elements of a surrounding environment of the autonomous vehicle with recorded positions in the map data 110. For instance, the localization system 130 can process the sensor data 104 (e.g., LIDAR data, RADAR data, camera data, etc.) for aligning or otherwise registering to a map of the surrounding environment (e.g., from the map data 110) to understand the autonomous vehicle's position within that environment. Accordingly, in some implementations, the autonomous vehicle can identify its position within the surrounding environment (e.g., across six axes, etc.) based on a search over the map data 110. In some implementations, given an initial location, the localization system 130 can update the autonomous vehicle's location with incremental re-alignment based on recorded or estimated deviations from the initial location. In some implementations, a position can be registered directly within the map data 110.

In some implementations, the map data 110 can include a large volume of data subdivided into geographic tiles, such that a desired region of a map stored in the map data 110 can be reconstructed from one or more tiles. For instance, a plurality of tiles selected from the map data 110 can be stitched together by the sub-control system 101 based on a position obtained by the localization system 130 (e.g., a number of tiles selected in the vicinity of the position).

In some implementations, the localization system 130 can determine positions (e.g., relative or absolute) of one or more attachments or accessories for an autonomous vehicle. For instance, an autonomous vehicle can be associated with a cargo platform, and the localization system 130 can provide positions of one or more points on the cargo platform. For example, a cargo platform can include a trailer or other device towed or otherwise attached to or manipulated by an autonomous vehicle, and the localization system 130 can provide for data describing the position (e.g., absolute, relative, etc.) of the autonomous vehicle as well as the cargo platform. Such information can be obtained by the other autonomy systems to help operate the autonomous vehicle.

The sub-control system(s) 101 can include the perception system 140, which can allow an autonomous platform to detect, classify, and track objects and actors in its environment. Environmental features or objects perceived within an environment can be those within the field of view of the sensor(s) 102 or predicted to be occluded from the sensor(s) 102. This can include object(s) not in motion or not predicted to move (static objects) or object(s) in motion or predicted to be in motion (dynamic objects/actors).

The perception system 140 can determine one or more states (e.g., current or past state(s), etc.) of one or more objects that are within the surrounding environment of an autonomous vehicle. For example, state(s) can describe (e.g., for a given time, time period, etc.) an estimate of an object's current or past location (also referred to as position); current or past speed/velocity; current or past acceleration; current or past heading; current or past orientation; size/footprint (e.g., as represented by a bounding shape, object highlighting, etc.); classification (e.g., pedestrian class vs. vehicle class vs. bicycle class, etc.); the uncertainties associated therewith; or other state information. In some implementations, the perception system 140 can determine the state(s) using one or more algorithms or machine-learned models configured to identify/classify objects based on inputs from the sensor(s) 102. The perception system can use different modalities of the sensor data 104 to generate a representation of the environment to be processed by the one or more algorithms or machine-learned models. In some implementations, state(s) for one or more identified or unidentified objects can be maintained and updated over time as the autonomous vehicle continues to perceive or interact with the objects (e.g., maneuver with or around, yield to, etc.). In this manner, the perception system 140 can provide an understanding about a current state of an environment (e.g., including the objects therein, etc.) informed by a record of prior states of the environment (e.g., including movement histories for the objects therein). Such information can be helpful as the autonomous vehicle plans its motion through the environment.

The sub-control system(s) 101 can include the planning system 150, which can be configured to determine how the autonomous platform is to interact with and move within its environment. The planning system 150 can determine one or more motion plans for an autonomous platform. A motion plan can include one or more trajectories (e.g., motion trajectories) that indicate a path for an autonomous vehicle to follow. A trajectory can be of a certain length or time range. The length or time range can be defined by the computational planning horizon of the planning system 150. A motion trajectory can be defined by one or more waypoints (with associated coordinates). The waypoint(s) can be future location(s) for the autonomous platform. The motion plans can be continuously generated, updated, and considered by the planning system 150.

The planning system 150 can determine a strategy for the autonomous platform. A strategy may be a set of discrete decisions (e.g., yield to actor, reverse yield to actor, merge, lane change) that the autonomous platform makes. The strategy may be selected from a plurality of potential strategies. The selected strategy may be a lowest cost strategy as determined by one or more cost functions. The cost functions may, for example, evaluate the probability of a collision with another actor or object.

The planning system 150 can determine a desired trajectory for executing a strategy. For instance, the planning system 150 can obtain one or more trajectories for executing one or more strategies. The planning system 150 can evaluate trajectories or strategies (e.g., with scores, costs, rewards, constraints, etc.) and rank them. For instance, the planning system 150 can use forecasting output(s) that indicate interactions (e.g., proximity, intersections, etc.) between trajectories for the autonomous platform and one or more objects to inform the evaluation of candidate trajectories or strategies for the autonomous platform. In some implementations, the planning system 150 can utilize static cost(s) to evaluate trajectories for the autonomous platform (e.g., "avoid lane boundaries," "minimize jerk," etc.). Additionally, or alternatively, the planning system 150 can utilize dynamic cost(s) to evaluate the trajectories or strategies for the autonomous platform based on forecasted outcomes for the current operational scenario (e.g., forecasted trajectories or strategies leading to interactions between actors, forecasted trajectories or strategies leading to interactions between actors and the autonomous platform, etc.). The planning system 150 can rank trajectories based on one or more static costs, one or more dynamic costs, or a combination thereof. The planning system 150 can select a motion plan (and a corresponding trajectory) based on a ranking of a plurality of candidate trajectories. In some implementations, the planning system 150 can select the highest ranked candidate, or a highest ranked feasible candidate.

The planning system 150 can then validate the selected trajectory against one or more constraints before the trajectory is executed by the autonomous platform.

To help with its motion planning decisions, the planning system 150 can be configured to perform a forecasting function. The planning system 150 can forecast future state(s) of the environment. This can include forecasting the future state(s) of other actors in the environment. In some implementations, the planning system 150 can forecast future state(s) based on current or past state(s) (e.g., as developed or maintained by the perception system 140). In some implementations, future state(s) can be or include forecasted trajectories (e.g., positions over time) of the objects in the environment, such as other actors. In some implementations, one or more of the future state(s) can include one or more probabilities associated therewith (e.g., marginal probabilities, conditional probabilities). For example, the one or more probabilities can include one or more probabilities conditioned on the strategy or trajectory options available to the autonomous vehicle. Additionally, or alternatively, the probabilities can include probabilities conditioned on trajectory options available to one or more other actors.

To implement selected motion plan(s), the sub-control system(s) 101 can include a control system 160 (e.g., a vehicle control system). Generally, the control system 160 can provide an interface between the sub-control system(s) 101 and the platform control devices 112 for implementing the strategies and motion plan(s) generated by the planning system 150. For instance, the control system 160 can implement the selected motion plan/trajectory to control the autonomous platform's motion through its environment by following the selected trajectory (e.g., the waypoints included therein). The control system 160 can, for example, translate a motion plan into instructions for the appropriate platform control devices 112 (e.g., acceleration control, brake control, steering control, etc.). By way of example, the control system 160 can translate a selected motion plan into instructions to adjust a steering component (e.g., a steering angle) by a certain number of degrees, apply a certain magnitude of braking force, increase/decrease speed, etc. In some implementations, the control system 160 can communicate with the platform control devices 112 through communication channels including, for example, one or more data buses (e.g., controller area network (CAN), etc.), onboard diagnostics connectors (e.g., OBD-II, etc.), or a combination of wired or wireless communication links. The platform control devices 112 can send or obtain data, messages, signals, etc. to or from the sub-control system(s) 101 (or vice versa) through the communication channel(s).

The sub-control system(s) 101 can receive, through communication interface(s) 106, assistive signal(s) from remote assistance system 170. Remote assistance system 170 can communicate with the sub-control system(s) 101 over a network. In some implementations, the sub-control system(s) 101 can initiate a communication session with the remote assistance system 170. For example, the sub-control system(s) 101 can initiate a session based on or in response to a trigger. In some implementations, the trigger may be an alert, an error signal, a map feature, a request, a location, a traffic condition, a road condition, etc.

After initiating the session, the sub-control system(s) 101 can provide context data to the remote assistance system 170. The context data may include sensor data 104 and state data of the autonomous vehicle. For example, the context data may include a live camera feed from a camera of the autonomous vehicle and the autonomous vehicle's current speed. An operator (e.g., human operator) of the remote assistance system 170 can use the context data to select assistive signals. The assistive signal(s) can provide values or adjustments for various operational parameters or characteristics for the sub-control system(s) 101. For instance, the assistive signal(s) can include way points (e.g., a path around an obstacle, lane change, etc.), velocity or acceleration profiles (e.g., speed limits, etc.), relative motion instructions (e.g., convoy formation, etc.), operational characteristics (e.g., use of auxiliary systems, reduced energy processing modes, etc.), or other signals to assist the sub-control system(s) 101.

The sub-control system(s) 101 can use the assistive signal(s) for input into one or more autonomy subsystems for performing autonomy functions. For instance, the planning system 150 can receive the assistive signal(s) as an input for generating a motion plan. For example, assistive signal(s) can include constraints for generating a motion plan. Additionally or alternatively, assistive signal(s) can include cost or reward adjustments for influencing motion planning by the planning system 150. Additionally, or alternatively, assistive signal(s) can be considered by the sub-control system(s) 101 as suggestive inputs for consideration in addition to other received data (e.g., sensor inputs, etc.).

The sub-control system(s) 101 may be platform agnostic, and the control system 160 can provide control instructions to platform control devices 112 for a variety of different platforms for autonomous movement (e.g., a plurality of different autonomous platforms fitted with autonomous control systems). This can include a variety of different types of autonomous vehicles (e.g., sedans, vans, SUVs, trucks, electric vehicles, combustion power vehicles, etc.) from a variety of different manufacturers/developers that operate in various different environments and, in some implementations, perform one or more vehicle services.

Figure 2:
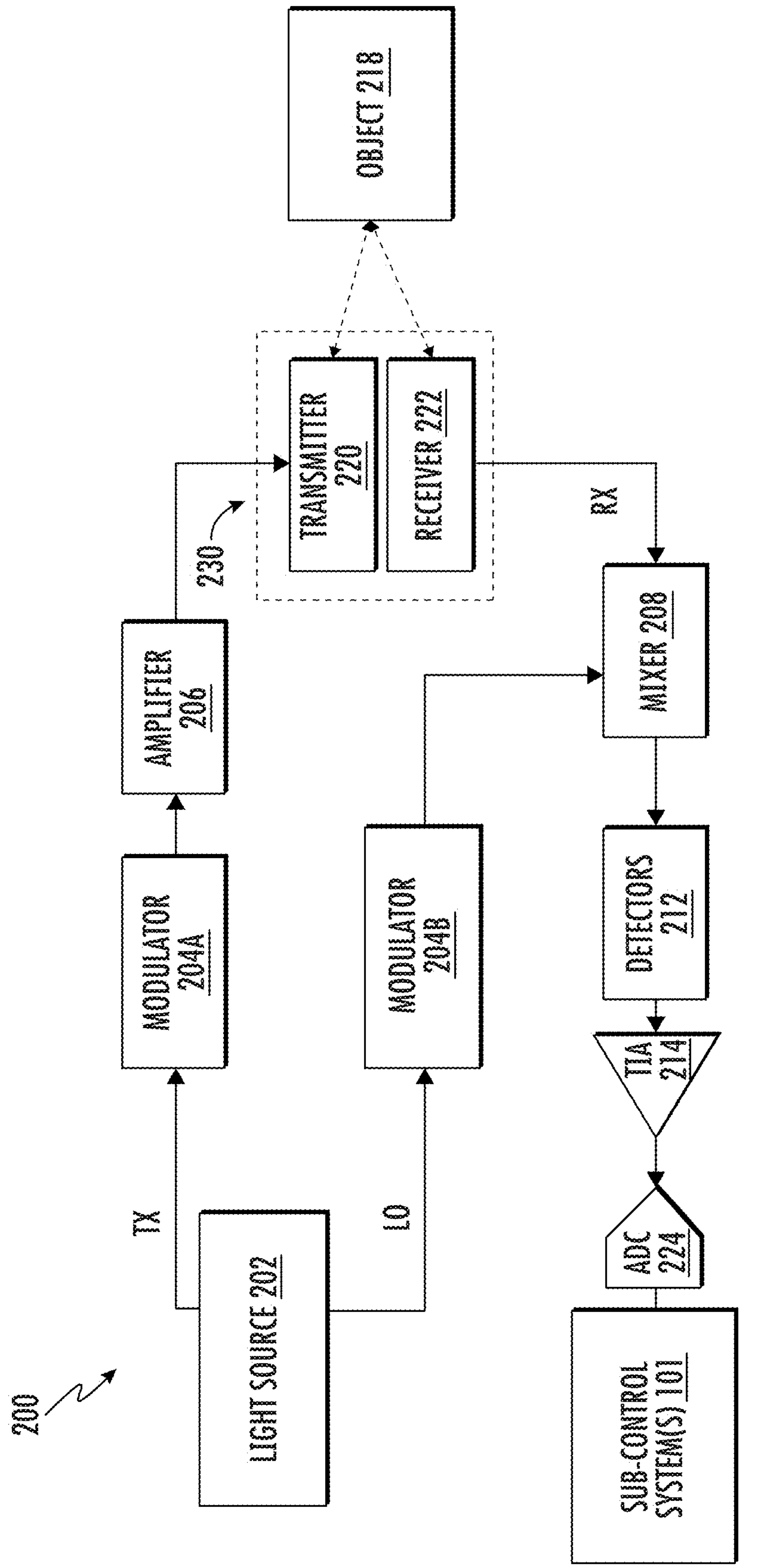
FIG. 2 is a block diagram of an example LIDAR system according to some implementations of the disclosure.

FIG. 2 is a block diagram illustrating an example LIDAR sensor system for autonomous vehicles, according to some implementations. The environment includes a LIDAR system 200 that includes a transmit (Tx) path and a receive (Rx) path. The Tx path includes one or more Tx input/output ports (e.g., channels), and the Rx path includes one or more Rx input/output ports (e.g., channels). In some implementations, a semiconductor substrate and/or semiconductor package may include the Tx path and/or the Rx path. In some implementations, the semiconductor substrate and/or semiconductor package may include at least one of silicon photonics circuitry, programmable logic controller (PLC), or group III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The LIDAR system 200 can be coupled to one or more sub-control system(s) 101 (e.g., the sub-control system(s) 101 of FIG. 1). In some implementations, the sub-control system(s) 101 may be coupled to the Rx path via the one or more Rx input/output ports. For instance, the sub-control system(s) 101 can receive LIDAR outputs from the LIDAR system 200. The sub-control system(s) 101 can control a vehicle (e.g., an autonomous vehicle) based on the LIDAR outputs.

The Tx path may include a light source (e.g., laser source) 202, a modulator 204A, a modulator 204B, an amplifier 206, and one or more transmitters 220. The Rx path may include one or more receivers 222, a mixer 208, a detector 212, a transimpedance amplifier (TIA) 214, and one or more analog-to-digital converters (ADCs) 224. Although FIG. 2 shows only a select number of components and only one input/output channel, the LIDAR system 200 may include any number of components and/or input/output channels (in any combination) that are interconnected in any arrangement to facilitate combining multiple functions of a LIDAR system, to support the operation of a vehicle.

The light source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The light source 202 may be configured to provide the light signal to the modulator 204A, which is configured to modulate a phase and/or a frequency of the light signal based on a first radio frequency (RF) signal (e.g., an "RF1" signal) to generate a modulated light signal, such as by Continuous Wave (CW) modulation or quasi-CW modulation. The modulator 204A may be configured to send the modulated light signal to the amplifier 206. The amplifier 206 may be configured to amplify the modulated light signal to generate an amplified light signal for transmission via the one or more transmitters 220. The one or more transmitters 220 may include one or more optical waveguides or antennas. In some implementations, modulator 204A and/or modulator 204B may have a bandwidth between 400 megahertz (MHz) and 1000 (MHz).

The LIDAR system 200 includes one or more transmitters 220 and one or more receivers 222. The transmitter(s) 220 and/or receiver(s) 222 can be included in a transceiver 230. The transmitter(s) 220 can provide the transmit beam that it receives from the Tx path into an environment within a given field of view toward an object 218. The one or more receivers 222 can receive a received beam reflected from the object 218 and provide the received beam to the mixer 208 of the Rx path. The one or more receivers 222 may include one or more optical waveguides or antennas. In some arrangements, the one or more transceivers 230 may include a monostatic transceiver or a bistatic transceiver.

The light source 202 may be configured to provide the LO signal to the modulator 204B, which is configured to modulate a phase and/or a frequency of the LO signal based on a second RF signal (e.g., an "RF2" signal) to generate a modulated LO signal (e.g., using Continuous Wave (CW) modulation or quasi-CW modulation) and send the modulated LO signal to the mixer 208 of the Rx path. The mixer 208 may be configured to mix (e.g., combine, multiply, etc.) the modulated LO signal with the returned signal to generate a down-converted signal and send the down-converted signal to the detector 212.

In some arrangements, the mixer 208 may be configured to send the modulated LO signal to the detector 212. The detector 212 may be configured to generate an electrical signal based on the down-converted signal and send the electrical signal to the TIA 214. In some arrangements, the detector 212 may be configured to generate an electrical signal based on the down-converted signal and the modulated signal. The TIA 214 may be configured to amplify the electrical signal and send the amplified electrical signal to the sub-control system(s) 101 via the one or more ADCs 224. In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms. In some implementations, detector 212 and/or TIA 214 may have a 3-decibel bandwidth between 80 kilohertz (kHz) and 450 megahertz (MHz).

The sub-control system(s) 101 may be configured to determine a distance to the object 218 and/or measure the velocity of the object 218 based on the one or more electrical signals that it receives from the TIA 214 via the one or more ADCs 224.

Figure 3A:
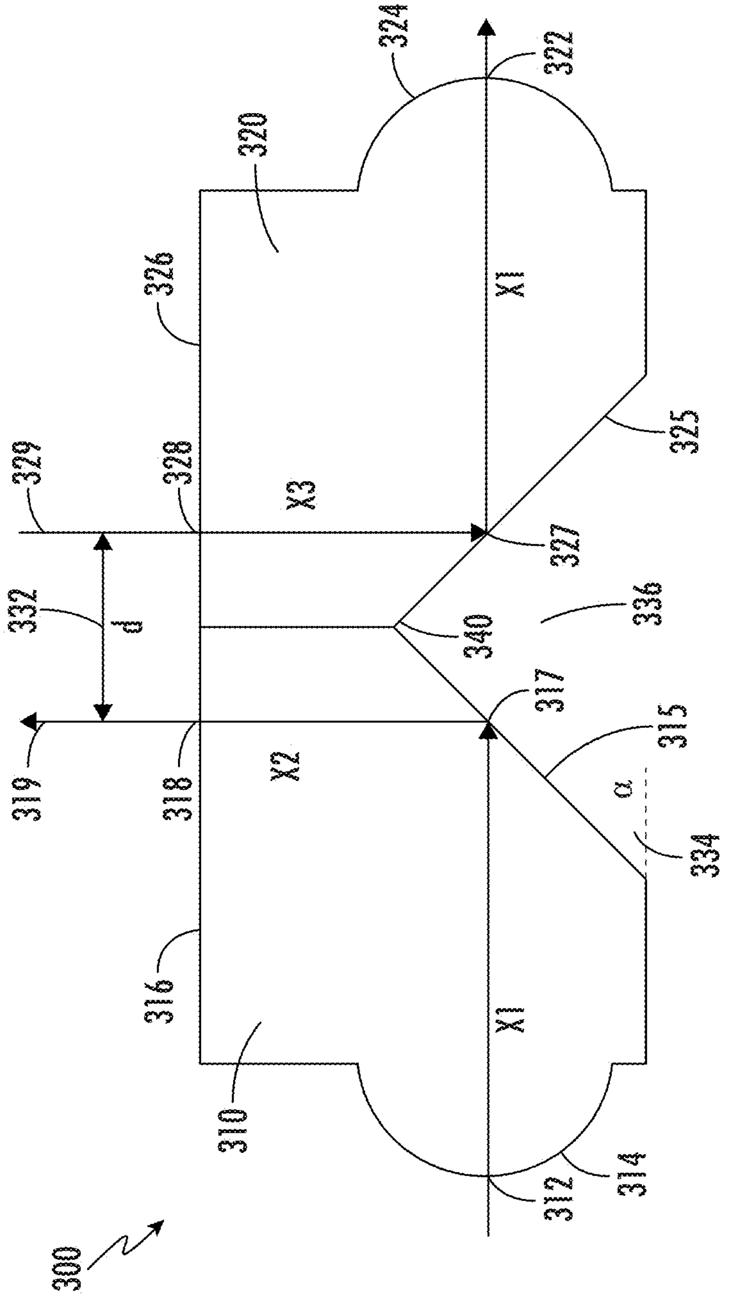
FIG. 3A is an example semiconductor optical device for a LIDAR system according to some implementations of the disclosure.

FIG. 3A depicts an example semiconductor optical device 300 for a LIDAR system according to some implementations of the disclosure. The semiconductor optical device 300 can be included in a LIDAR system, such as the LIDAR system 200 of FIG. 2 (e.g., as part of the transceiver 230), the LIDAR system 350 of FIG. 3B, and the like.

In FIG. 3A, the semiconductor optical device 300 may include two portions, for example a first portion 310 and a second portion 320. The first portion 310 and the second portion 320 may be respectively fabricated using a semiconductor material, such as silicon, glass, polymer, doped plastic, or other suitable material. In some implementations, the first portion 310 and the second portion 320 may be combined or integrated together as a single device. For example, the first portion 310 and the second portion 320 may be joined together via a metal coating 340. The metal coating 340 may be configured or formed of a material to prevent an outgoing light 319 from mixing with an incoming light 329. In some implementations, the semiconductor optical device 300 may include two bonded monolithic silicon microlens arrays (e.g., corresponding to the first portion 310 and the second portion 320, respectively) that each have integrated turning mirrors.

In some implementations, the first portion 310 may form at least part of a transmit path and the second portion 320 may form at least part of a receive path of a LIDAR device. The first portion 310 includes a first lens portion 314, a first internal portion 315, and a first external portion 316. The outgoing light 319 may enter the first lens portion 314 at a first location 312 and be reflected by the first internal portion 315 (which acts as a mirror) at a second location 317, and then be transmitted out of the first external portion 316 at a third location 318 to an environment (e.g., toward an object). The outgoing light 319 may reflect off an object in the environment and be reflected back toward the semiconductor optical device 300. The light which is reflected off the object and back toward the semiconductor optical device 300 may correspond to the incoming light 329.

The second portion 320 includes a second lens portion 324, a second internal portion 325, and a second external portion 326. The incoming light 329 may enter the second external portion 326 at a fourth location 328 and be reflected by the second internal portion 325 (which acts as a mirror) at a fifth location 327, and then be transmitted out of the second lens portion 324 at a sixth location 322 to an environment (e.g., toward a receiver such as receiver 368 in FIG. 3B).

The first lens portion 314 may include an optical lens that is configured to direct (e.g., collimate) the outgoing light 319 that is transmitted along a first direction x1 and enters at the first location 312 and focuses the outgoing light 319 onto the first internal portion 315 where it is reflected in a second direction x2 toward the first external portion 316. For example, the first lens portion 314 may include a spherical lens, a cylindrical lens, an elliptical lens, and the like. In some implementations, the first lens portion 314 may be formed of a silicon material, a polymer plastic material, etc. In some implementations, the first lens portion 314 may include an anti-reflective coating which is configured or formed to minimize reflection and increase light transmission through the first lens portion 314. The anti-reflective coating may include magnesium fluoride, silicon dioxide, dielectric coatings, and the like.

The second location 317 of the first internal portion 315 may be configured to receive the outgoing light 319 which is transmitted along the first direction x1 and direct the outgoing light 319 in the second direction x2 toward the third location 318 of the first external portion 316. In some implementations, the first direction x1 and the second direction x2 may be perpendicular to one another, or substantially perpendicular (e.g., ±10 degrees). In some implementations, the first internal portion 315 may be configured to redirect or reflect the outgoing light 319 by internal reflection. In some implementations, the first internal portion 315 may include or be formed of a material which is configured to redirect or reflect the outgoing light 319. For example, a metal layer may be provided at an outer side of the first internal portion 315 (i.e., the side of the first internal portion 315 that faces an interior portion 336) which may be hollow and/or composed of air. For example, an anti-reflective layer may be provided at an outer side of the first internal portion 315. For example, the first internal portion 315 may be configured to be angled with respect to the first direction x1 by a predetermined angle α 334. In some implementations, the predetermined angle α 334 may be about 45 degrees. In some implementations, the predetermined angle α 334 may be between about 40 degrees and about 50 degrees, between about 30 degrees and about 60 degrees, or between about 20 degrees and about 70 degrees.

For example, the first external portion 316 may be configured to receive the outgoing light 319 which is transmitted along the second direction x2 to the third location 318 and direct the outgoing light 319 in the second direction x2 toward an environment (e.g., toward an object in the environment, toward a sensor, etc.). In some implementations, the first external portion 316 may be formed of a silicon material, a polymer plastic material, etc. In some implementations, the first external portion 316 may include an anti-reflective coating which is configured or formed to minimize reflection and increase light transmission through the first external portion 316. The anti-reflective coating may include magnesium fluoride, silicon dioxide, dielectric coatings, and the like.

As mentioned above, the outgoing light 319 may reflect off an object in the environment and be reflected back toward the semiconductor optical device 300. The light which is reflected off the object and back toward the semiconductor optical device 300 may correspond to the incoming light 329. For example, the second external portion 326 may be configured to receive the incoming light 329 which is transmitted along a third direction x3 at a fourth location 328 and direct the incoming light 329 in the third direction x3 toward a fifth location 327 at the second internal portion 325. In some implementations, the fourth location 328 and third location 318 may be separated from each other by a distance d 332. In some implementations, the outgoing light 319 and the incoming light 329 may be separated from each other by the distance d 332. For example, the distance d 332 may be about 100 μm, for example, about 80 μm to about 120 μm, for example between about 10 μm to about 1 mm. In some implementations, the outgoing light 319 and the incoming light 329 may be parallel to one another or substantially parallel to one another (e.g., within ±5 degrees, ±10 degrees, etc.).

In some implementations, the second external portion 326 may be formed of a silicon material, a polymer plastic material, etc. In some implementations, the second external portion 326 may include an anti-reflective coating which is configured or formed to minimize reflection and increase light transmission through the second external portion 326. The anti-reflective coating may include magnesium fluoride, silicon dioxide, dielectric coatings, and the like.

For example, the fifth location 327 at the second internal portion 325 may be configured to receive the incoming light 329 which is transmitted along the third direction x3 and direct the incoming light 329 in the second direction x2 toward a sixth location 322 at the second lens portion 324. In some implementations, the first direction x1 and the third direction x3 may be perpendicular to one another, or substantially perpendicular (e.g., ±10 degrees). In some implementations, the second internal portion 325 may be configured to redirect or reflect the incoming light 329 by internal reflection. In some implementations, the second internal portion 325 may include or be formed of a material which is configured to redirect or reflect the incoming light 329. For example, the first portion 310 (e.g., the first internal portion 315 which acts as a first mirror) and the second portion 320 (e.g., the second internal portion 325 which acts as a second mirror) may be joined together at a location which forms a notch and corresponds to the metal coating 340, particularly where the first and second mirrors (e.g., the first internal portion 315 and the second internal portion 325) intersect. For example, a metal layer may be provided at an outer side of the second internal portion 325 which faces the interior portion 336 which may be hollow and/or composed of air. For example, an anti-reflective layer may be provided at an outer side of the second internal portion 325. For example, the second internal portion 325 may be configured to be angled with respect to the first direction x1 by a predetermined angle α 334. In some implementations, the predetermined angle α may be about 45 degrees. In some implementations, the predetermined angle α may be between about 30 degrees and about 60 degrees.

Figure 3B:
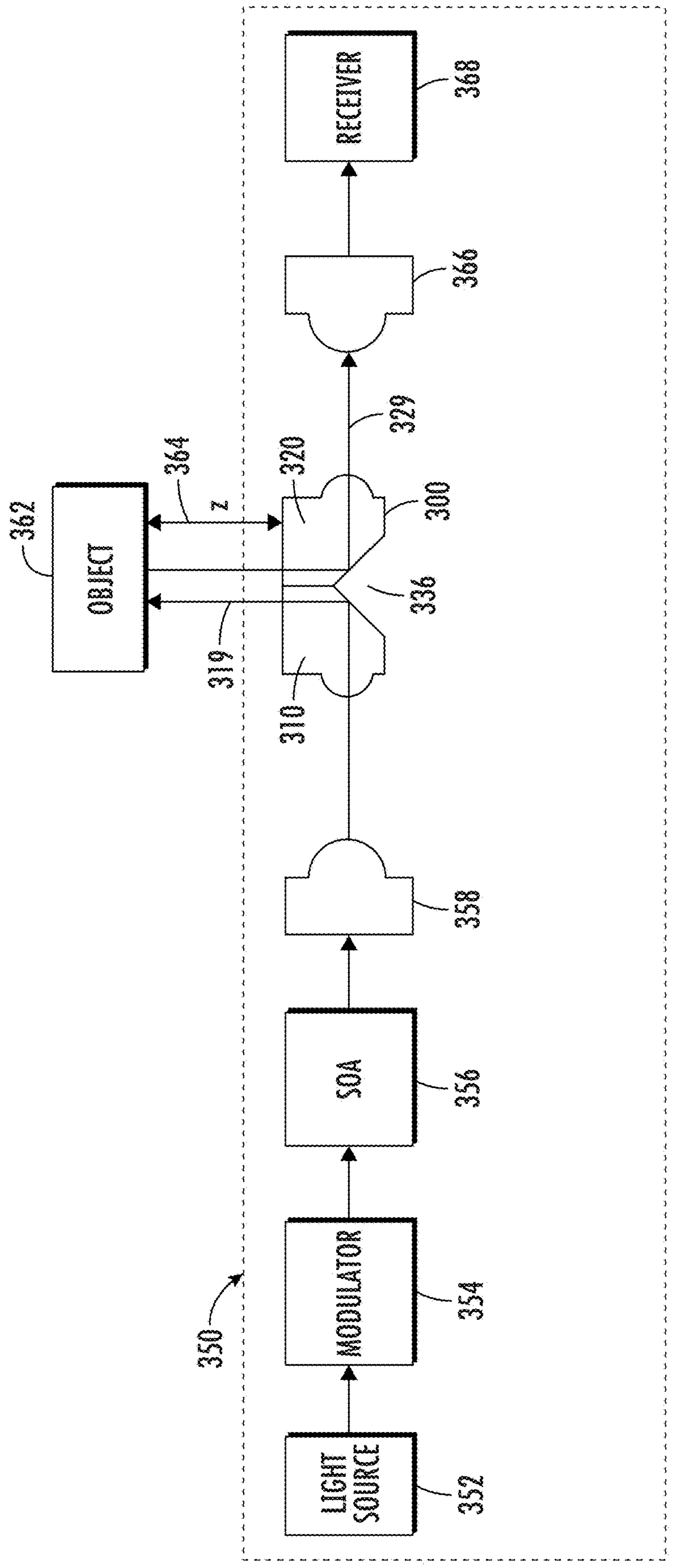
FIG. 3B is a block diagram of an example LIDAR system, according to some implementations of the disclosure.

For example, the second lens portion 324 may include an optical lens that is configured to direct (e.g., collimate) the incoming light 329 that is transmitted along the first direction x1 from the second internal portion 325 and exits at the sixth location 322 to be transmitted toward an environment (e.g., toward a receiver such as receiver 368 in FIG. 3B). For example, the second lens portion 324 may include a spherical lens, a cylindrical lens, an elliptical lens, and the like. In some implementations, the second lens portion 324 may be formed of a silicon material, a polymer plastic material, etc. In some implementations, the second lens portion 324 may include an anti-reflective coating which is configured or formed to minimize reflection and increase light transmission through the second lens portion 324. The anti-reflective coating may include magnesium fluoride, silicon dioxide, dielectric coatings, and the like.

FIG. 3B is a block diagram of an example LIDAR system 350, according to some implementations of the disclosure. The semiconductor optical device 300 can be included in the LIDAR system 350, for example.

The LIDAR system 350 can include a light source 352, a modulator 354, one or more semiconductor optical amplifiers (SOAs) 356, a first optical component 358, the semiconductor optical device 300, a second optical component 366, and a receiver 368. In some implementations, the light source 352 may be integrated into the semiconductor-based LIDAR sensor system 350. In some implementations, the light source 352 may be external to the semiconductor-based LIDAR sensor system 350.

The light source 352 can be configured to provide a light beam (e.g., a laser beam). The light source 352 can provide the light beam to the modulator 354 (e.g., a phase modulator). In some implementations, the light beam can be split among a plurality of channels (e.g., a plurality of transmit channels) that each carry a portion of the beam from the light source 352. For instance, each transmit channel may correspond to a respective transmit output to provide a portion of the light beam to a respective portion of the environment of the LIDAR system 350 such that the LIDAR system 350 can scan multiple proximate points simultaneously. In some implementations, a local oscillator (LO) signal may also be output from the light source 352 (e.g., in a manner similar to that shown in FIG. 3B). The LO signal may be equivalent to the signal from the light source 352 or may be modulated from the signal from the light source 352 (e.g., by an LO modulator such as modulator 204B of FIG. 2).

The modulator 354 can be configured to modulate the light beam output by the light source 352 to modify a phase and/or a frequency of the light beam. In some embodiments, the modulator 354 can be a silicon phase modulator. The modulator 354 can modulate the light beam by, for example, using Continuous Wave (CW) modulation or quasi-CW modulation. In some implementations, the modulator 354 can be disposed on a transmit die or another suitable substrate.

The LIDAR system 350 can include one or more amplifiers configured to receive the light beam from the light source 352 (e.g., via the modulator 354) and amplify the light beam. The amplifiers may include, for example, the one or more semiconductor optical amplifiers (SOAs) 356.

The first optical component 358 may be configured to receive the light beam emitted by the light source 352 (e.g., via the modulator 354 and the one or more SOAs 356). The first optical component 358 may include a lens, for example a collimating lens or a micro lens array. In some implementations the first optical component 358 can include one or more optic components including an oscillatory scanner, a unidirectional scanner, a Risley prism, a circulator optic, and/or a beam collimator, etc.

The semiconductor optical device 300 may be configured to receive the light beam output by the first optical component 358 and transmit the light beam (e.g., the outgoing light 319) to an environment of the LIDAR system 350 (e.g., to the object 362). Aspects of the semiconductor optical device 300 have been described with respect to FIG. 3A, and therefore a detailed discussion of the operations and features of the semiconductor optical device 300 will be omitted for the sake of brevity. The semiconductor optical device 300 may be configured to receive the light beam reflected back from the object 362 in the environment and transmit the reflected light beam (e.g., the incoming light 329) to the second optical component 366. In some implementations, the light beam (e.g., the outgoing light 319) and the reflected light beam (e.g., the incoming light 329) may be coherent.

The second optical component 366 may be configured to receive the reflected light beam (e.g., the incoming light 329) from the environment (e.g., via the semiconductor optical device 300). The second optical component 366 may include a lens, for example a collimating lens or a micro lens array. In some implementations the second optical component 366 can include one or more optic components including an oscillatory scanner, a unidirectional scanner, a Risley prism, a circulator optic, and/or a beam collimator, etc. The second optical component 366 may be configured to direct the reflected light beam (e.g., the incoming light 329) toward the receiver 368.

The receiver 368 may be configured to receive the reflected light beam (e.g., the incoming light 329) from the environment (e.g., via the semiconductor optical device 300 and the second optical component 366). In some implementations, the reflected light beam can be provided among a plurality of receive channels, where each receive channel captures a portion of transmitted light from a respective transmit channel (e.g., the outgoing light 319) after being reflected by a corresponding point in the environment (e.g., the object 362). In addition to the receive channels, the receiver 368 can include an LO channel configured to receive the LO signal output by the light source 352.

As described herein, tolerance requirements for some optical components (e.g., the semiconductor optical device) in a LIDAR system may be very tight (e.g., less than ten μm, less than five μm, less than one μm, etc.). For example, a manufacturing specification may specify that a transmitted light beam and a received light beam be separated by a predetermined distance (e.g., by about 100 μm). However, ensuring this level of manufacturing tolerance as well as alignment precision can be very challenging. Aligning the semiconductor optical device in the LIDAR system may be inhibited or made difficult by the lack of space (e.g., to utilize high-magnification imaging systems which require very short working distances).

Described herein are methods for manufacturing a semiconductor optical device for a LIDAR system which can ensure that specification requirements are satisfied. As described in more detail herein, the method may be implemented to determine a position of the semiconductor optical device based on an interference pattern.

Figure 4A:
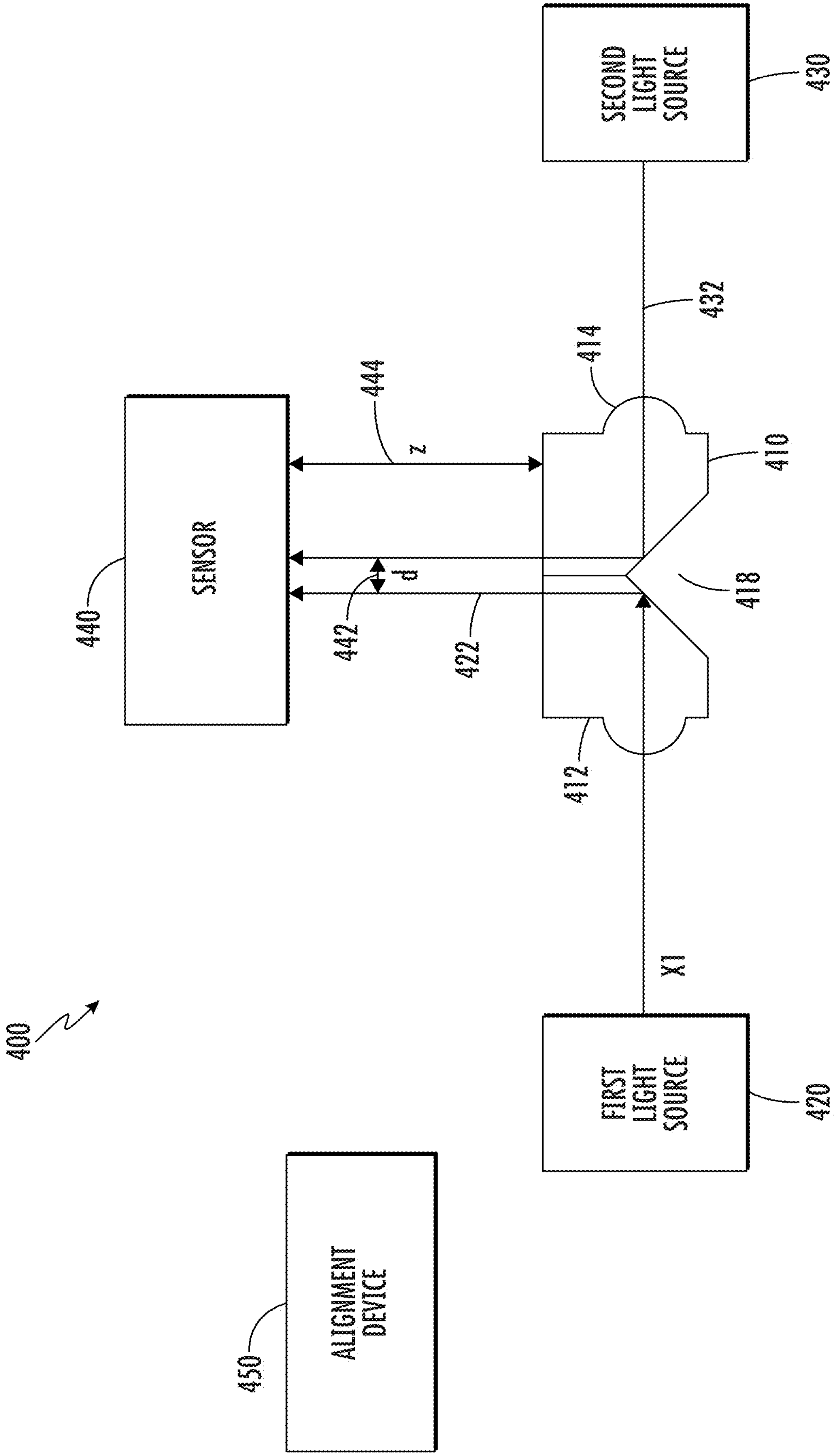
FIG. 4A is a block diagram of an example alignment system, according to some implementations of the disclosure.
Figure 4B:
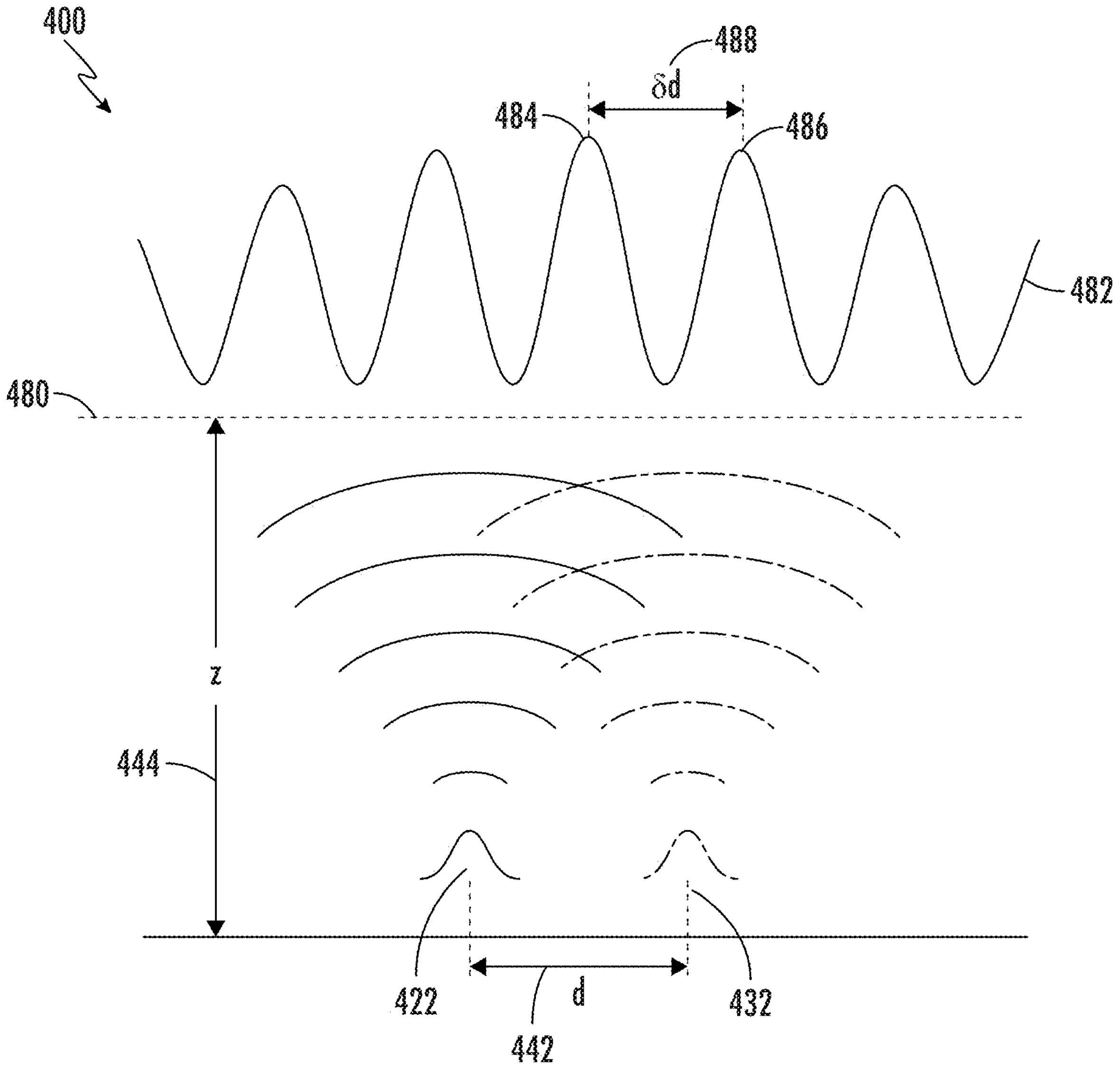
FIG. 4B includes example aspects of signal interference associated with an alignment system, according to some implementations of the disclosure.
Figure 4C:
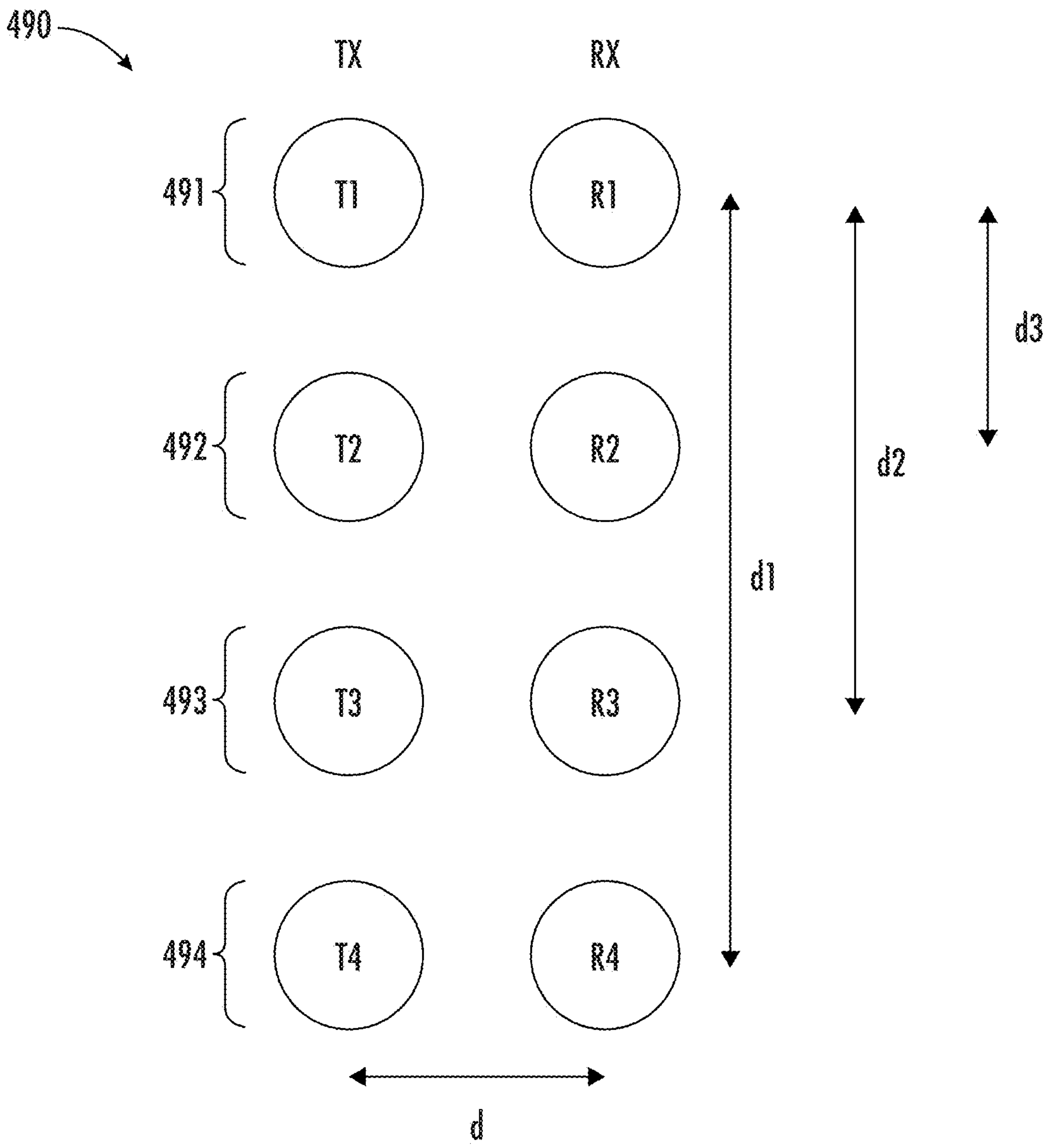
FIG. 4C includes example aspects of alignment among a plurality of semiconductor optical devices in an alignment system, according to some implementations of the disclosure.

FIG. 4A is a block diagram of an example alignment system 400, according to some implementations of the disclosure. FIG. 4B depicts example aspects of signal interference associated with an alignment system, according to some implementations of the disclosure. FIG. 4C depicts example aspects of alignment among a plurality of semiconductor optical devices in an alignment system, according to some implementations of the disclosure. The alignment system 400 shown in FIG. 4A can include a semiconductor optical device 410, a first light source 420, a second light source 430, a sensor 440, and an alignment device 450, for example. The semiconductor optical device 410 of FIG. 4A can correspond to the semiconductor optical device 300 described with respect to FIGS. 3A-3B, and therefore a detailed description of the semiconductor optical device 410 will be omitted for the sake of brevity. Likewise, the first light source 420 and the second light source 430 can correspond to the light source 352 described with respect to FIG. 3B, and therefore a detailed description of these components will be omitted for the sake of brevity. The semiconductor optical device 410 may be included in an optical system (e.g., an optical assembly, a photonics module, etc.) of the semiconductor-based LIDAR system. In some implementations, the first light source 420 and the second light source 430 may be integrated into the semiconductor-based LIDAR sensor system. In some implementations, the first light source 420 and the second light source 430 may be external to the semiconductor-based LIDAR sensor system. In some implementations, the first light source 420 and the second light source 430 may be coherent. In some implementations, the first light beam 422 and the second light beam 432 may be coherent.

According to examples of the disclosure, a method for manufacturing a semiconductor optical device for a LIDAR sensor system for a vehicle includes aligning a first light beam 422 and a second light beam 432 of the semiconductor optical device 410. For example, the first light beam 422 and the second light beam 432 may be aligned based on an interference pattern 482 associated with the first light beam 422 and the second light beam 432. In some implementations, the interference pattern 482 may be measured by a sensor 440. For example, the sensor 440 may be disposed at a propagation distance z 444 from the semiconductor optical device 410. In some implementations, the propagation distance z 444 may correspond to a distance between a focal plane of the sensor 440 and a beam waist associated with a light beam (e.g., the first light beam 422 or the second light beam 432). The beam waist refers to the point in the propagation direction of the light beam where the light-beam diameter converges to a minimum. For example, the propagation distance z 444 may be about 10 mm, about 20 mm, about 30 mm, about 40 mm, about 50 mm, about 100 mm, about 200 mm, etc. For example, the disclosed method may be implemented to align a distance d 442 between the first light beam 422 and the second light beam 432 to within a predetermined tolerance distance (e.g., within about ±10 μm, within about ±5 μm, within about ±1 μm, etc.). For example, the disclosed method may be implemented to align a distance d 442 between a first beam waist associated with the first light beam 422 and a second beam waist associated with the second light beam 432 to within a predetermined tolerance distance (e.g., within about ±10 μm, within about ±5 μm, within about ±1 μm, etc.).

In some implementations, the sensor 440 may correspond to an optical measurement device which is configured to analyze or measure characteristics of one or more light beams (e.g., one or more laser beams) associated with an optical component (e.g., the semiconductor optical device 410). For example, the sensor 440 may include an image sensor (e.g., a scanning slit beam profiler, a near infrared camera, etc.). In some implementations, the sensor 440 may be configured to measure an intensity (e.g., a spatial intensity distribution) of the first light beam 422 and the second light beam 432. For example, the sensor 440 may be configured to provide a cross-sectional view of a light beam's profile (e.g., in a horizontal or x-direction and/or in a vertical or y-direction). Characteristics of the light beam may include a beam width, divergence characteristics, asymmetries, and an overall spatial profile.

In some implementations, the sensor 440 may be configured to output information relating to the interference pattern 482 which can be used to determine a position of the first light beam 422 relative to the second light beam 432 (e.g., a distance d 442 between the first light beam 422 and the second light beam 432). The interference pattern 482 results from interference between the first light beam 422 and the second light beam 432 and includes a pattern of fringes which are regions where the first light beam 422 and the second light beam 432 are superimposed with each other. Fringe spacing (or fringe width) refers to the distance between adjacent fringes. For example, the method may include determining or measuring an interference fringe spacing δd 488 associated with the interference pattern 482 which can be used to determine the relative positioning of the first light beam 422 relative to the second light beam 432. Fringe spacing is directly related to the wavelength of the light beams and inversely related to the separation of the light beams. Based on the fringe spacing and a known wavelength associated with the light beams, a distance between the light beams can be determined.

In some implementations, the interference pattern 482 may include a plurality of fringes (e.g., first fringe 484 and second fringe 486) whose separation distance δd 488 depends (e.g., directly) on the relative positioning of the first light beam 422 and the second light beam 432, and for example, on the relative positioning of the first light beam 422 and the second light beam 432 associated with the semiconductor optical device 410.

For example, where the first light beam 422 and the second light beam 432 are identical except for a spatial offset along the first direction x1, the spacing of fringes in the interference pattern is given approximately by: $\delta d \sim \lambda z/\Delta x$ where λ corresponds to the wavelength of the light source, and Δx corresponds to distance d 442. The fringe spacing can depend directly on the wavelength λ, the distance between the two light beams Δx, and the distance from the semiconductor optical device 410 (or the beam waist) to the focal plane z (e.g., interference plane 480). For example, the distance z can serve to effectively amplify the impact of the light beam offset Δx. For example, if Δx is small (e.g., 100 μm), the fringe separation can be measured via the sensor 440 when a sufficiently large value for propagation distance z 444 is utilized. For example, for light sources having a wavelength of 1550 nm where a focal plane of the sensor 440 is placed 50 mm from a nominal focal plane of the semiconductor optical device 410 (which can correspond to the location of the beam waist), the following results associated with the fringe spacing may be obtained:

| z | $\Delta x_1$ | $\delta d_1$ | $\Delta x_2$ | $\delta d_2$ | $\delta d_2 - \delta d_1$ |
|---|---|---|---|---|---|
| 50 mm | 100 μm | 775 μm | 106 μm | 731 μm | 44 μm |
| 50 mm | 100 μm | 775 μm | 102 μm | 760 μm | 15 μm |
| 50 mm | 100 μm | 775 μm | 101 μm | 767 μm | 8 μm |

As illustrated in the above table, a decrease in fringe spacing is associated with an increase in distance between the first light beam 422 and the second light beam 432. For example, the alignment system 400 may be configured to determine a change in fringe spacing based on at least the distance between the semiconductor optical device 410 and the sensor 440 and based upon a width between the fringes which are being relied upon for measuring the fringe spacing. Increasing the distance between the semiconductor optical device 410 and the sensor 440 can result in increasing fringe spacing (e.g., doubling the propagation distance z 444 can double the fringe spacing δd 488. To increase a measurement accuracy, a difference in width between two fringes (with intervening fringes provided therebetween) can be utilized for measuring fringe spacing rather than utilizing a difference in width between two fringes which are directly adjacent to each other. For example, for z=50 mm, the difference in a span of 10 fringes for a 100 μm beam separation and 101 μm beam separation is 80 μm (8 μm×10) which can be measured by the sensor 440 (e.g., by a scanning slit beam profiler) more accurately.

The semiconductor optical device 410 may be provided in a first alignment position within the LIDAR sensor system. The alignment system 400 may be configured to obtain an interference pattern 482 associated with the first light beam 422 emitted by the first light source 420 that passes through the semiconductor optical device 410 at a first location and a second light beam 432 emitted by the second light source 430 that passes through the semiconductor optical device 410 at a second location. For example, the interference pattern 482 may be indicative of an intensity of interference between the first light beam 422 and the second light beam 432 as the first light beam 422 and the second light beam 432 propagate.

The alignment system 400 may be configured to determine a position of the first location (which is associated with the first light beam 422) relative to the second location (which is associated with the second light beam) based on the interference pattern 482. For example, the alignment system 400 may be configured to determine the position of the first location relative to the second location based on the interference pattern 482 by determining, based on the interference pattern 482, a distance between the first light beam 422 and the second light beam 432. For example, the alignment system 400 may be configured to determine a spacing (e.g., δd 488) between peaks of adjacent fringes (e.g., the first fringe 484 and the second fringe 486) among the plurality of fringes, wherein the spacing between the peaks of the adjacent fringes corresponds to the distance d 442 between the first light beam 422 and the second light beam 432. For example, the distance between the first light beam 422 and the second light beam 432 may be between about 80 μm to about 120 μm, for example, about 100 μm.

The alignment system 400 may be configured to obtain the interference pattern 482 by providing, at a particular distance away from the semiconductor optical device 410, a sensor 440 (e.g., an image sensor) for the LIDAR sensor system, and by controlling one or more light sources to emit the first light beam 422 toward the sensor 440, wherein the first light beam 422 passes through the semiconductor optical device 410 at the first location, and while the first light beam 422 is being emitted, controlling the one or more light sources to emit the second light beam 432 toward the sensor 440, wherein the second light beam 432 passes through the semiconductor optical device 410 at the second location. While FIG. 4A shows the first light source 420 and the second light source 430, in some implementations, a single light source may be implemented to emit the first light beam 422 and the second light beam 432 (e.g., by splitting a light beam into two separate light beams).

The alignment system 400 may be configured to align the semiconductor optical device 410 in a second alignment position within the LIDAR sensor system, based on the position of the first location relative to the second location. For example, given a real-time estimate of the fringe spacing produced by interfering sets of beams, the real-time relative positioning of those beams can be extracted and used to determine the quality of an alignment (positioning) of the semiconductor optical device 410, as well as to provide feedback to the alignment device 450 which can be configured to orient and fix the semiconductor optical device 410 and/or other component of the LIDAR system. For example, the alignment device 450 may be configured to align the semiconductor optical device 410 in the second alignment position based on the position of the first location relative to the second location by orienting the semiconductor optical device 410 until the position of the first location relative to the second location is within a threshold tolerance range of a particular distance between the first location and the second location (e.g., within about ±10 μm of a particular distance of 100 μm, within about ±5 μm of a particular distance of 100 μm, within about ±1 μm of a particular distance of 100 μm, etc.).

When the semiconductor optical device 410 is aligned within tolerance requirements and implemented in the LIDAR system (e.g., LIDAR system 350), the semiconductor optical device 410 may be configured to direct the first light beam 422 in a first direction toward an environment of the LIDAR system 350 (or of a vehicle). For example, the semiconductor optical device 410 may be configured to receive the first light beam 422 which is reflected from an object in the environment and direct the reflected light beam (e.g., incoming light 329) in a second direction, different from the first direction, toward a receiver (e.g., receiver 368).

Referring to FIG. 4C, an example array of semiconductor optical devices is shown, according to some implementations of the disclosure. For example, in some implementations a plurality of semiconductor optical devices 410 may be provided, including a first semiconductor optical device 491 (having a transmit light beam T1 and receive light beam R1), a second semiconductor optical device 492 (having a transmit light beam T2 and receive light beam R2), a third semiconductor optical device 493 (having a transmit light beam T3 and receive light beam R3), and a fourth semiconductor optical device 494 (having a transmit light beam T4 and receive light beam R4). Although four example semiconductor optical devices are described with reference to FIG. 4C, it should be appreciated that the disclosed alignment systems and methods may be employed with a fewer or greater number of devices (e.g., optical devices for all channels (e.g., 8 channels, 16 channels, etc.) in a transceiver of a LIDAR system).

In some implementations, light beams from adjacent or nearby semiconductor optical devices can be emitted or directed toward the sensor 440 to align the semiconductor optical devices with each other and/or within the LIDAR system with respect to other components of the LIDAR system. For example, the alignment system 400 may be configured to generate an interference pattern based on a first light beam emitted toward the sensor 440 from the first semiconductor optical device 491 and a second light beam emitted toward the sensor 440 from the fourth semiconductor optical device 494, which can be used to determine the distance d1 as illustrated in FIG. 4C. That is, the alignment system 400 may be configured to obtain an additional interference pattern associated with a first light beam that passes through the first semiconductor optical device 491 and a second light beam that passes through the fourth semiconductor optical device 494, and determine a position of the first light beam relative to the second light beam, based on the additional interference pattern.

The alignment system 400 may further be configured to align the first semiconductor optical device 491 and the fourth semiconductor optical device 494 within the LIDAR sensor system, based on the position of the first light beam relative to the second light beam. For example, the alignment system 400 may be configured to generate an interference pattern based on a first light beam emitted toward the sensor 440 from first semiconductor optical device 491 and a third light beam emitted toward the sensor 440 from the third semiconductor optical device 493, which can be used to determine the distance d2 as illustrated in FIG. 4C. For example, the alignment system 400 may be configured to generate an interference pattern based on a first light beam emitted toward the sensor 440 from first semiconductor optical device 491 and a fourth light beam emitted toward the sensor 440 from the second semiconductor optical device 492, which can be used to determine the distance d3 as illustrated in FIG. 4C.

In some implementations, other distances between other semiconductor optical devices may be determined (e.g., between second semiconductor optical device 492 and fourth semiconductor optical device 494, or between second semiconductor optical device 492 and third semiconductor optical device 493). In some implementations, the semiconductor optical devices may be stacked in a linear arrangement within the LIDAR system. In some implementations, the semiconductor optical devices may be provided adjacent to each other in a length or width-wise direction within the LIDAR system.

FIGS. 5 through 12 are example results from simulations in which example interference patterns are generated for estimating or determining a beam displacement between adjacent or nearby light beams, according to some implementations of the disclosure.

Figure 5:
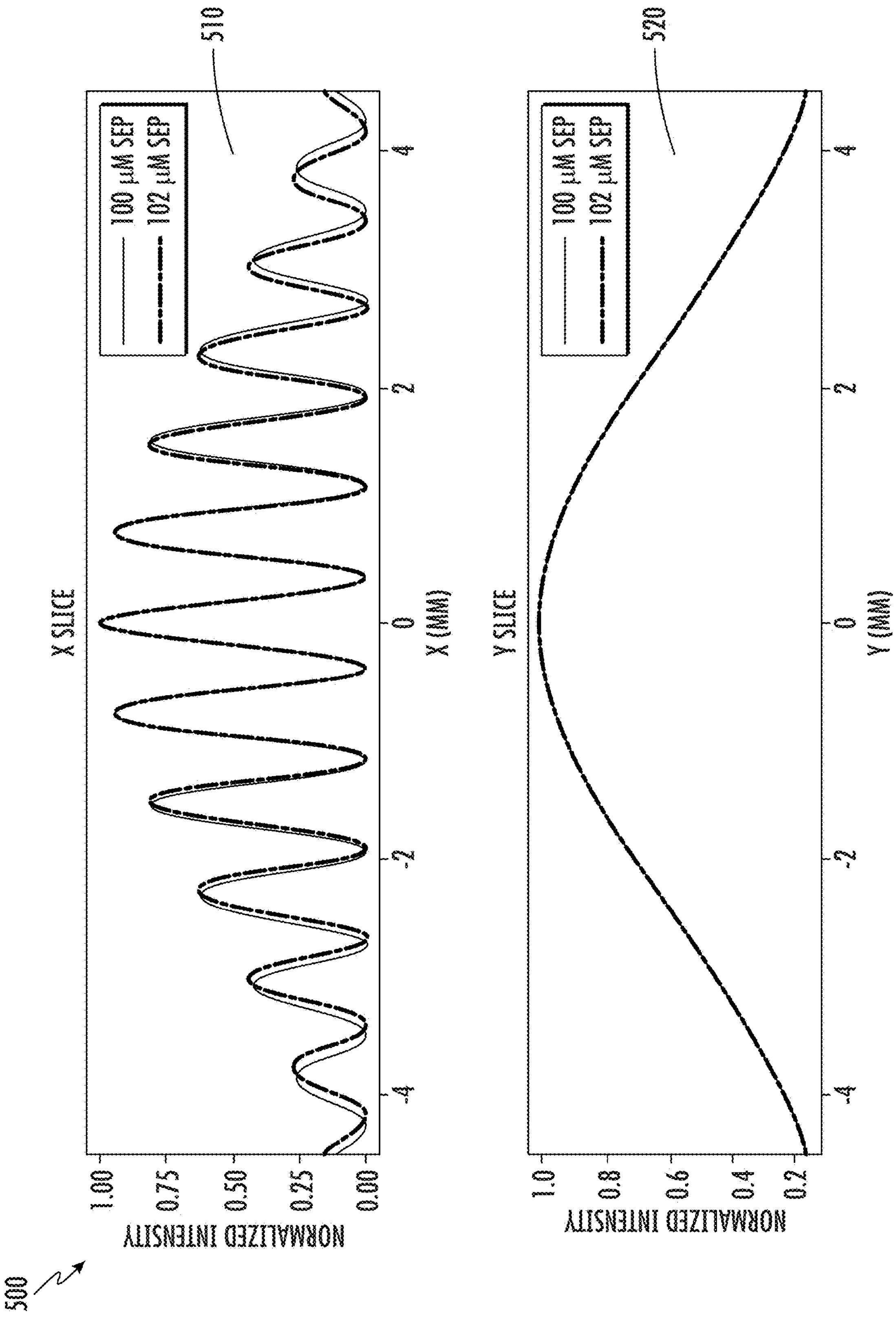
FIGS. 5 through 12 are example diagrams for estimating or determining a beam displacement between light beams, according to some implementations of the disclosure.

FIG. 5 depicts simulation results 500 including two intensity patterns 510 calculated in a 1D slice along an x-axis and two intensity patterns 520 calculated in a 1D slice along a y-axis, to mimic the behavior of a scanning slit beam profiler. In the simulation, the interference plane is assumed to be 9 mm wide with a resolution of 5 μm to further emulate a scanning slit beam profiler. As can be seen from FIG. 5, a first interference pattern produced by two Gaussian beams indicates the light beams are separated by 100 μm along the x direction, and a second interference pattern indicates the light beams are separated by 102 μm. In both cases, the power in each beam is assumed to be equal and no noise is considered. The simulation results 500 illustrate that a 2 μm difference in beam displacements can be resolved using a fringe pattern from the intensity patterns.

For example, to extract the separation distance between two light beams based on an interference pattern, the alignment system 400 may be configured to perform a Fourier transform operation with respect to the intensity pattern and to perform peak finding to find the spatial frequency of the fringes.

Figure 6:
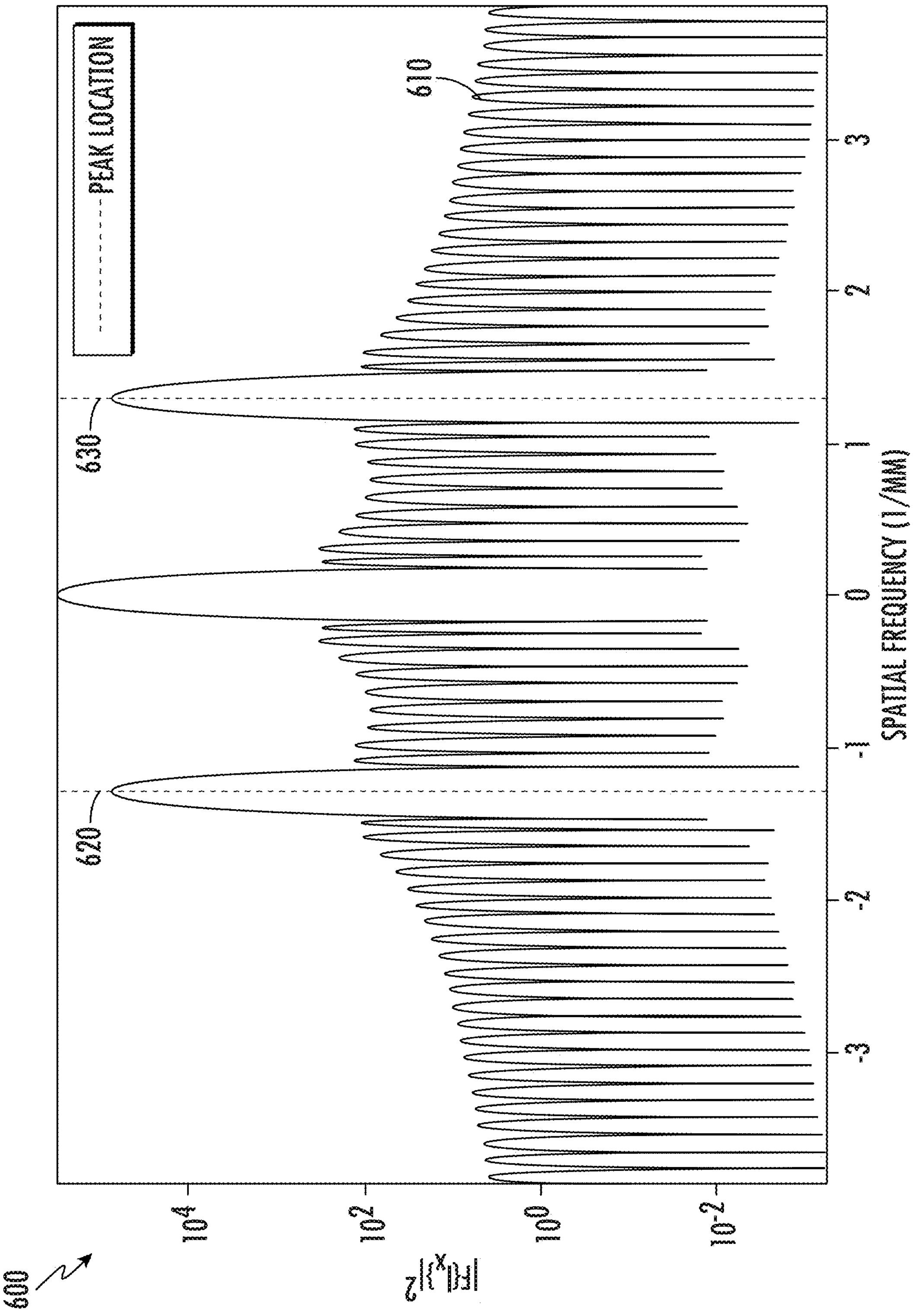

In some implementations, to resolve a precise frequency, the interference pattern may be zero-padded and the peaks may be fit with a Gaussian profile. The center of the Gaussian fit may correspond to the estimated spatial frequency. Given a measure of the spatial frequency $f_x$ (or $f_y$), the alignment system 400 may be configured to determine or estimate the spacing of fringes in the measured intensity pattern with: $\delta x=1/f_x$. FIG. 6 depicts Fourier transform results 600 associated with an interference pattern, according to some implementations of the disclosure. For example, the Fourier transform results 600 include a waveform 610 having a first peak 620 and a second peak 630. The alignment system 400 may be configured to identify the first peak 620 and the second peak 630 to find the spatial frequency of the fringes. For example, the peaks of the waveform (e.g., the first peak 620 and the second peak 630) may correspond to the fringes of the interference pattern.

Figure 7:
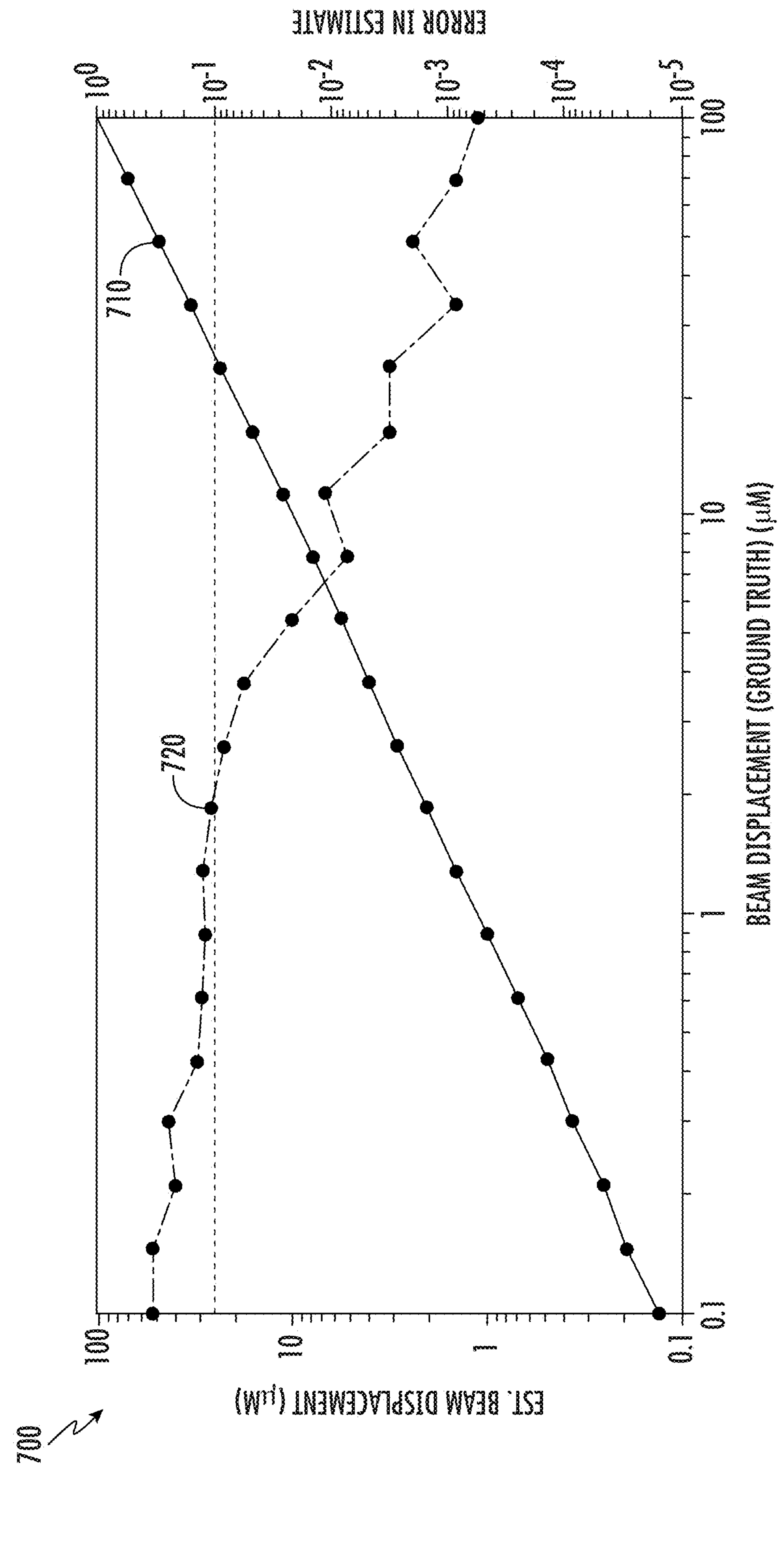

Further, the alignment system 400 may be configured to determine or estimate the beam separation distance by: $\Delta x \sim \lambda z/\delta x$, where z is known or can be calibrated. For example, the error in z directly translates into an error in the estimate of $\Delta x$. The same process for determining or estimating the beam separation distance applies identically for the y direction. FIG. 7 depicts a graph 700 which shows a comparison of the estimated beam separation as a function of the actual beam separation based on the Fourier transform of FIG. 6. For example, the first trace 710 (associated with the left y-axis) indicates the estimated beam offset extracted from the Fourier transform of the interference pattern. The second trace 720 (associated with the right y axis) indicates the relative error between the actual beam separation and estimated beam separation.

Figure 8:
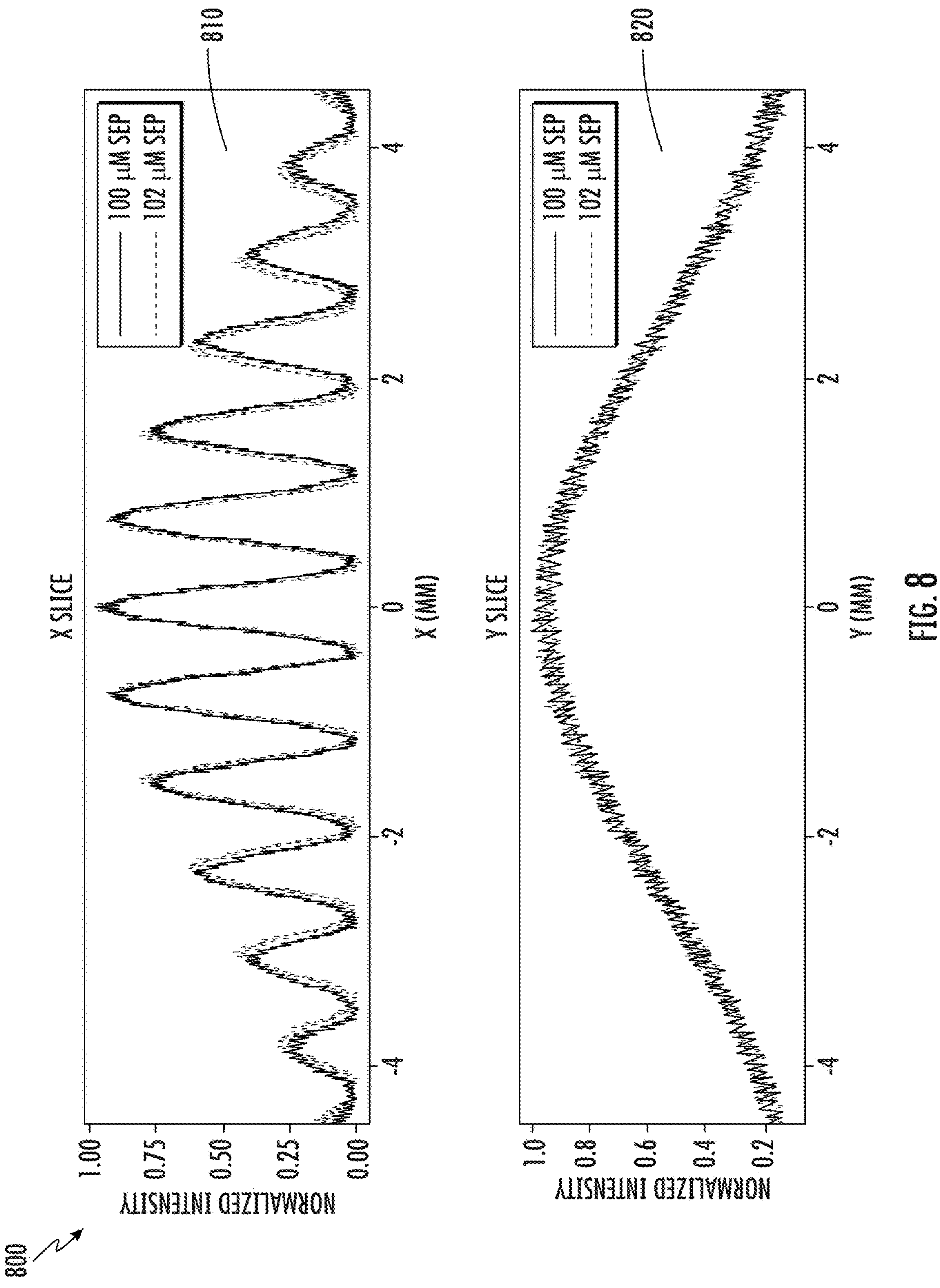

FIG. 8 depicts simulation results 800 including two intensity patterns 810 calculated in a 1D slice along an x-axis and two intensity patterns 820 calculated in a 1D slice along a y-axis, to mimic the behavior of a scanning slit beam profiler. In the simulation, the interference plane is assumed to be 9 mm wide with a resolution of 5 μm to further emulate a scanning slit beam profiler. As can be seen from FIG. 8, a first interference pattern produced by two Gaussian beams indicates the light beams are separated by 100 μm along the x direction, and a second interference pattern indicates the light beams are separated by 102 μm. Different from the simulation results of FIG. 5, in both cases from the example of FIG. 8, the power in each beam is assumed to be equal and noise is considered. The simulation results 800 again illustrate that a 2 μm difference in beam displacements can be resolved using a fringe pattern from the intensity patterns.

For example, to extract the separation distance between two light beams based on an interference pattern, the alignment system 400 may be configured to perform a Fourier transform operation with respect to the intensity pattern and to perform peak finding to find the spatial frequency of the fringes.

Figure 9:
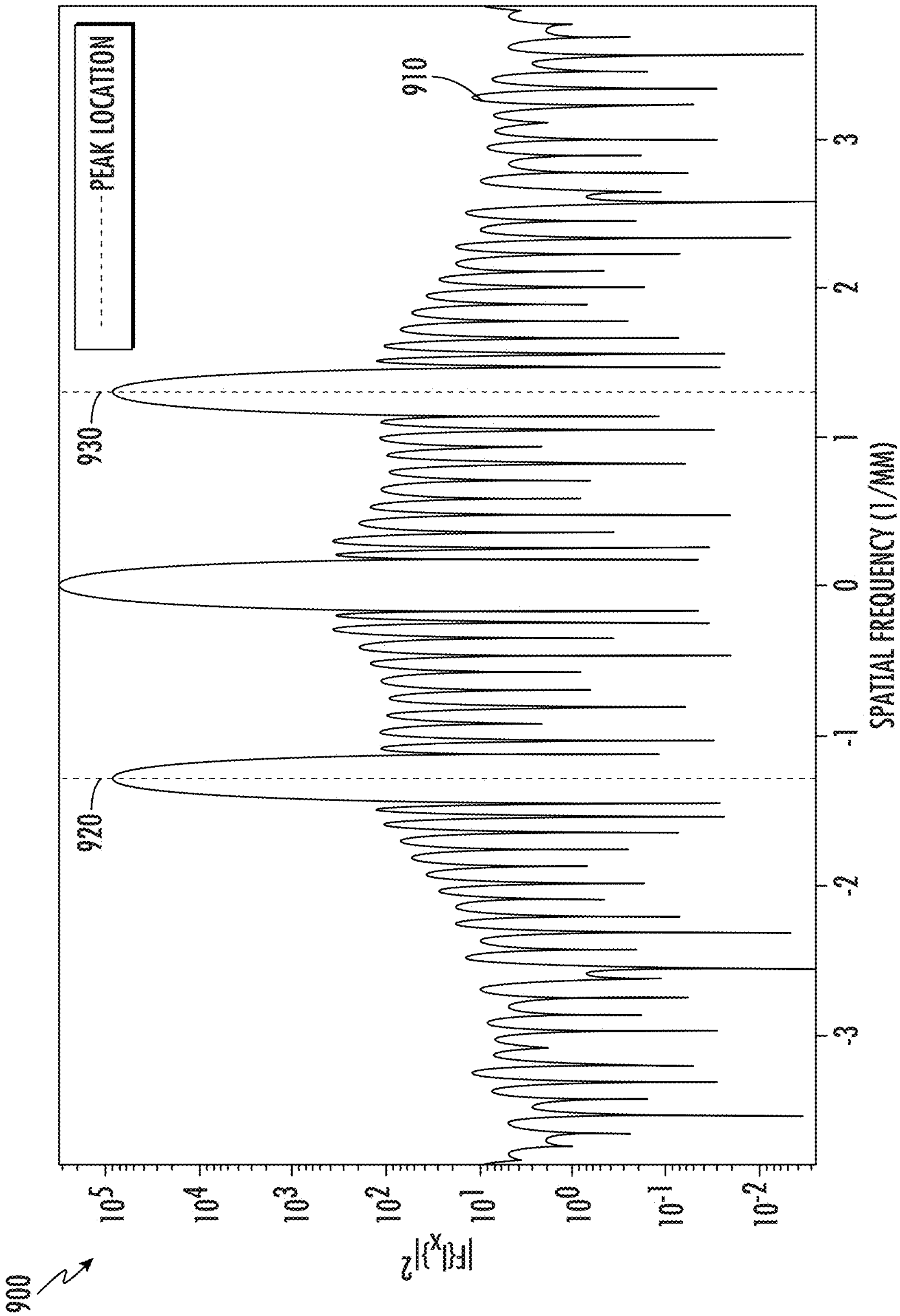

In some implementations, to resolve a precise frequency, the interference pattern may be zero-padded and the peaks may be fit with a Gaussian profile. The center of the Gaussian fit may correspond to the estimated spatial frequency. Given a measure of the spatial frequency $f_x$ (or $f_y$), the alignment system 400 may be configured to determine or estimate the spacing of fringes in the measured intensity pattern with: $\delta x=1/f_x$. FIG. 9 depicts Fourier transform results 900 associated with an interference pattern (such as that generated in FIG. 8 when noise is taken into account), according to some implementations of the disclosure. For example, the Fourier transform results 900 include a waveform 910 having a first peak 920 and a second peak 930. The alignment system 400 may be configured to identify the first peak 920 and the second peak 930 to find the spatial frequency of the fringes. For example, the peaks of the waveform (e.g., the first peak 920 and the second peak 930) may correspond to the fringes of the interference pattern.

Figure 10:
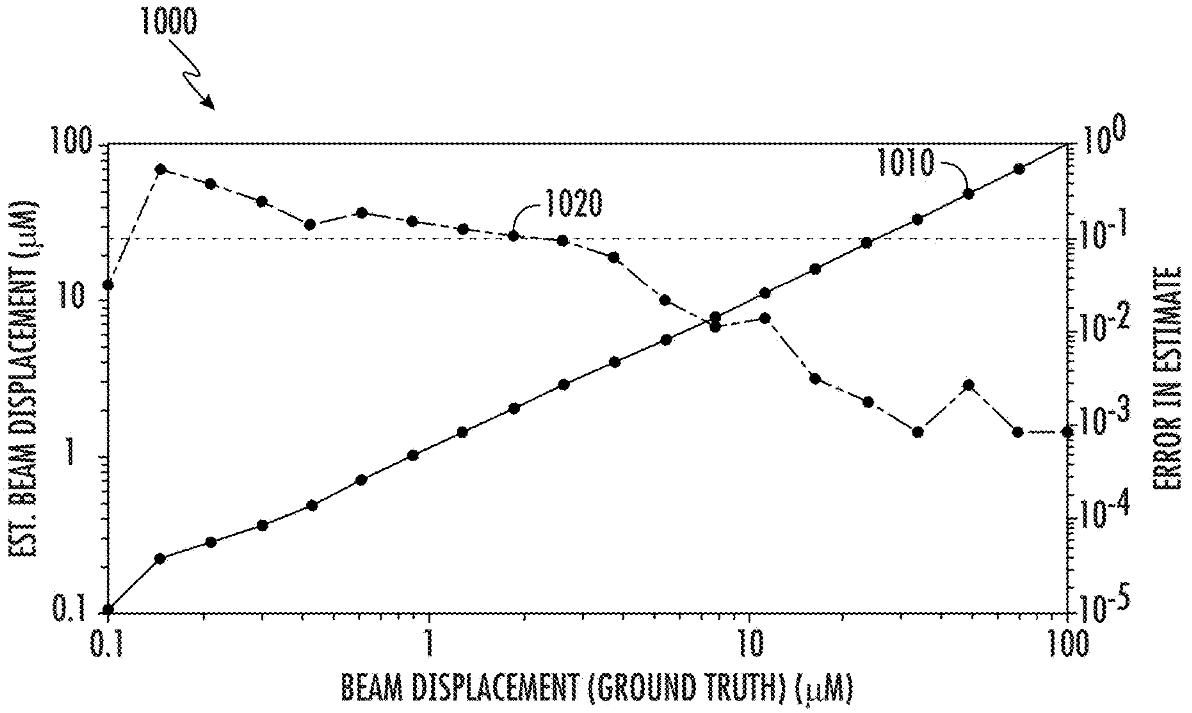

Further, the alignment system 400 may be configured to determine or estimate the beam separation distance by: $\Delta x \sim \lambda z/\delta x$, where z is known or can be calibrated. For example, the error in z directly translates into an error in the estimate of Δx). The same process for determining or estimating the beam separation distance applies identically for the y direction. FIG. 10 depicts a graph 1000 which shows a comparison of the estimated beam separation as a function of the actual beam separation based on the Fourier transform of FIG. 9. For example, the first trace 1010 (associated with the left y-axis) indicates the estimated beam offset extracted from the Fourier transform of the interference pattern. The second trace 1020 (associated with the right y axis) indicates the relative error between the actual beam separation and estimated beam separation.

Figure 11:
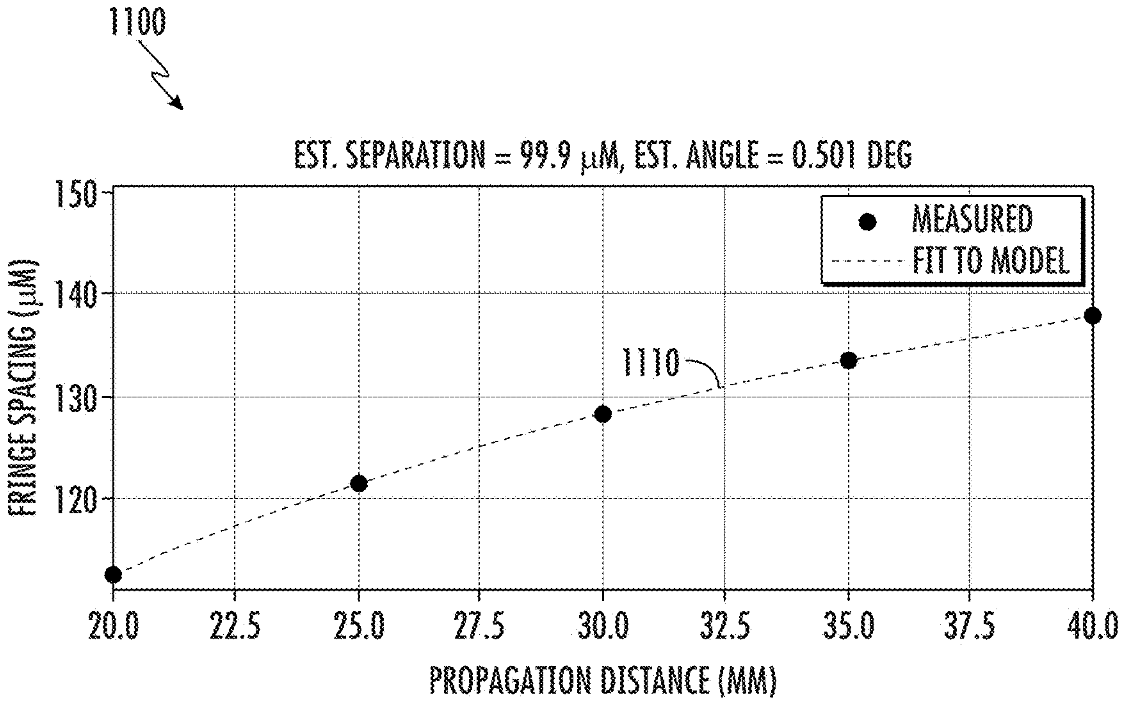

FIG. 11 is an example simulation result 1100 which depicts a plot of fringe spacing versus a propagation distance for two beams having a non-zero relative angle. In some circumstances, the light beams emitted by the light sources may have a non-zero relative angle. This relative angle can have a significant effect on the interference pattern. For example, if the relative angle is small, the interference fringe spacing becomes $\delta d \sim \lambda/(\Delta x/z+\Delta\theta)$ where λ corresponds to the wavelength of the light source, Δx corresponds to distance d 442, and Δθ is the relative angle between the two light beams. For example, for light sources having a wavelength of 1550 om where a focal plane of the sensor 440 is placed 40 mm from a nominal focal plane of the semiconductor optical device 410 (which can correspond to the location of the beam waist), the following results associated with the fringe spacing may be obtained:

| z | Δx□ | Δθ | δd |
|---|---|---|---|
| 40 mm | 100 μm | 0.0° | 620 μm |
| 40 mm | 100 μm | 0.1° | 259 μm |
| 40 mm | 100 μm | 0.5° | 78 μm |

According to the above results, even a 0.1 degree angle can reduce the fringe spacing by more than a factor of 2.

In FIG. 11, the fringe spacing is modeled by the curve 1110 which is fit along various points which correspond to fringe spacings measured from the interference pattern at different propagation distances. In some implementations, the alignment system 400 may be configured to obtain the interference pattern 482 associated with the first light beam 422 emitted by the first light source 420 that passes through the semiconductor optical device 410 at the first location and the second light beam 432 emitted by the second light source 430 that passes through the semiconductor optical device 410 at the second location. The alignment system 400 may be configured to determine the position of the first location (which is associated with the first light beam 422) relative to the second location (which is associated with the second light beam 432) based on the interference pattern 482 and based on a relative angle Δθ between the first light beam 422 and the second light beam 432. For example, the alignment system 400 may be configured to determine the spacing (e.g., δd 488) between peaks of adjacent fringes (e.g., the first fringe 484 and the second fringe 486) among the plurality of fringes, wherein the spacing between the peaks of the adjacent fringes is associated with the distance d 442 between the first light beam 422 and the second light beam 432 and the relative angle 40. For example, the distance between the first light beam 422 and the second light beam 432 may be between about 80 μm to about 120 μm, for example, about 100 μm. In some implementations, the method described herein includes the alignment system 400 being configured to measure the fringe spacing at a plurality of different propagation distances and to measure the fringe spacing at each of the different propagation distances to determine a curve for fitting a model that can be used to estimate the relative angle Δθ as well as a beam separation distance Δx between the first location and the second light beam 432.

Figure 12:
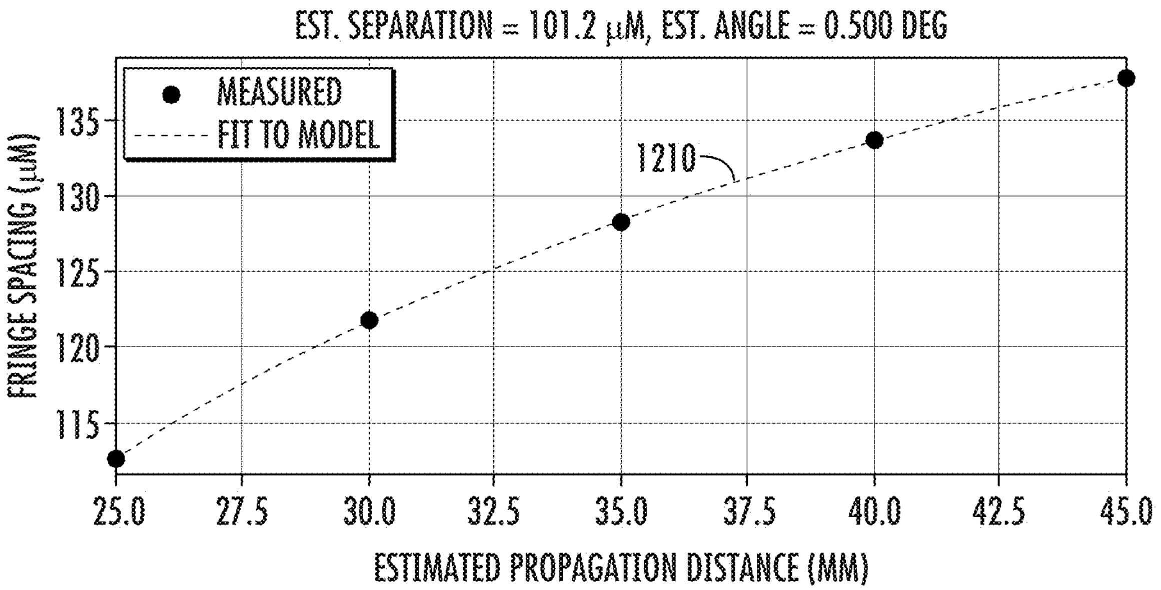

FIG. 12 is an example simulation result 1200 which depicts a plot of fringe spacing versus a propagation distance for two beams having a non-zero relative angle and uncertainty in the propagation distance z. In some circumstances, the propagation distance z between the focal plane of the image sensor and the beam waist may not be precisely known. An error in propagation distance z is linked to an error in the distance Δx. In some implementations, the alignment system 400 may be configured to utilize a fiber array having a well-defined fiber spacing. In some implementations, the alignment system 400 may be configured to correct for the uncertainty in the propagation distance z by utilizing another fit parameter $z_o$. For example, an expression for determining the interference fringe spacing becomes $\delta d \sim \lambda/(\Delta x/(z-z_o)+\Delta\theta)$ where $\lambda$ corresponds to the wavelength of the light source. $\Delta x$ corresponds to distance d 442, $z_o$ is a fit parameter, and $\Delta\theta$ is the relative angle between the two light beans.

In FIG. 12, the fringe spacing is modeled by the curve 1210 which is fit along various points which correspond to fringe spacings measured from the interference pattern at different propagation distances for a circumstance in which there is introduced a 5 mm systematic error in the propagation distance z. In some implementations, the alignment system 400 may be configured to obtain the interference pattern 482 associated with the first light beam 422 emitted by the first light source 420 that passes through the semiconductor optical device 410 at the first location and the second light beam 432 emitted by the second light source 430 that passes through the semiconductor optical device 410 at the second location. The alignment system 400 may be configured to determine the position of the first location (which is associated with the first light beam 422) relative to the second location (which is associated with the second light beam 432) based on the interference pattern 482 and based on an estimated error in the propagation distance (e.g., accounted for by fit parameter $z_o$) and in some circumstances additionally a relative angle 40 between the first light beam 422 and the second light beam 432. For example, the alignment system 400 may be configured to determine the spacing (e.g., od 488) between peaks of adjacent fringes (e.g., the first fringe 484 and the second fringe 486) among the plurality of fringes, wherein the spacing between the peaks of the adjacent fringes is associated with the distance d 442 between the first light beam 422 and the second light beam 432, the fit parameter $z_o$, and in some circumstances the relative angle 40. For example, the distance between the first light beam 422 and the second light beam 432 may be between about 80 μm to about 120 μm, for example, about 100 μm. In some implementations, the method described herein includes the alignment system 400 being configured to measure the fringe spacing at a plurality of different propagation distances and to measure the fringe spacing at each of the different propagation distances to determine a curve for fitting a model that can be used to estimate the error in the propagation distance z, as well as a beam separation distance $\Delta x$ between the first location and the second light beam 432.

Figure 13:
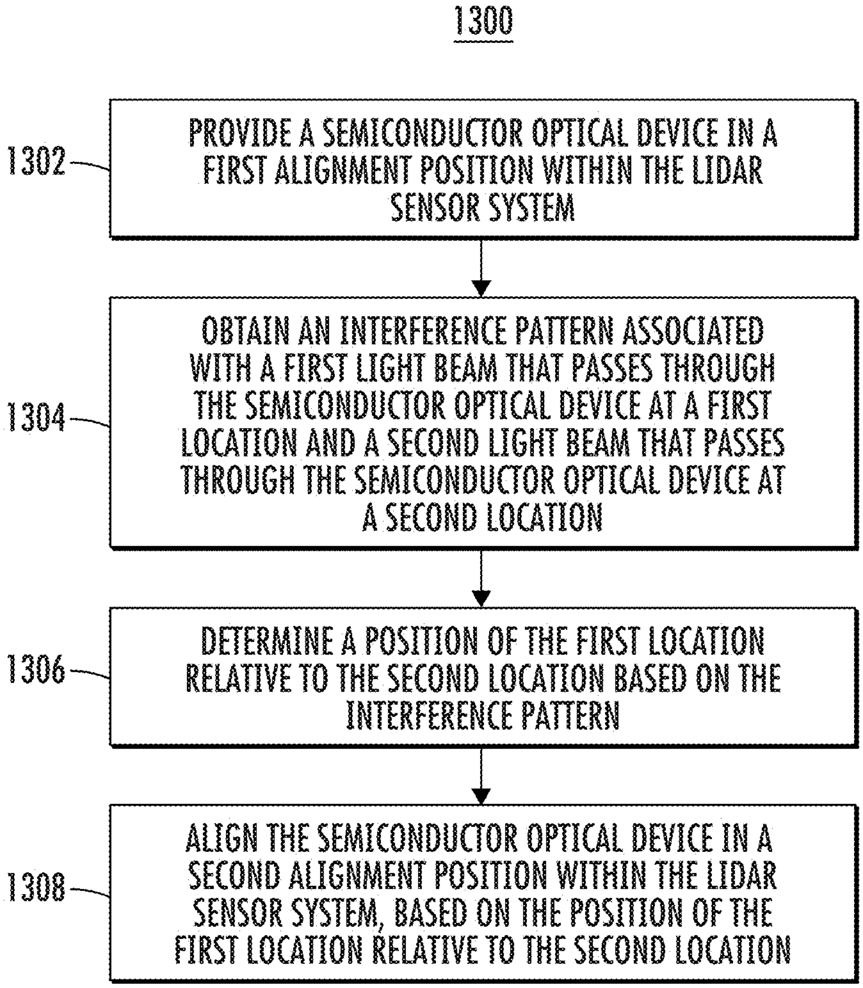
FIGS. 13-16 are flow diagrams of example, non-limiting computer-implemented methods, according to one or more example embodiments of the disclosure.

FIG. 13 is a flow diagram of an example, non-limiting computer-implemented method, according to one or more example embodiments of the disclosure.

The flow diagram of FIG. 13 illustrates a method 1300 for manufacturing a semiconductor-based LIDAR sensor system for a vehicle, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 13, at operation 1302, the method 1300 includes providing a semiconductor optical device in a first alignment position within the LIDAR sensor system. For example, the semiconductor optical device may correspond to the semiconductor optical device 300 of FIGS. 3A-3B or the semiconductor optical device 410 of FIG. 4A. The LIDAR sensor system may correspond to the LIDAR system 200 of FIG. 2, the LIDAR system 350 of FIG. 3B, or the alignment system 400 of FIG. 4 which can include components of the LIDAR system 200 or the LIDAR system 350.

At operation 1304, the method 1300 includes obtaining an interference pattern associated with a first light beam that passes through the semiconductor optical device at a first location and a second light beam that passes through the semiconductor optical device at a second location. For example, the alignment system 400 may be configured to obtain an interference pattern 482 associated with the first light beam 422 emitted by the first light source 420 that passes through the semiconductor optical device 410 at a first location (e.g., at the third location 318) and a second light beam 432 emitted by the second light source 430 that passes through the semiconductor optical device 410 at a second location (e.g., at the fourth location 328). For example, the interference pattern 482 may be indicative of an intensity of interference between the first light beam 422 and the second light beam 432 as the first light beam 422 and the second light beam 432 propagate.

At operation 1306, the method 1300 includes determining a position of the first location relative to the second location based on the interference pattern. For example, the alignment system 400 may be configured to determine a position of the first location (which is associated with the first light beam 422) relative to the second location (which is associated with the second light beam) based on the interference pattern 482. For example, the alignment system 400 may be configured to determine the position of the first location relative to the second location (e.g., the distance d 332 or distance d 442) based on the interference pattern 482 by determining, based on the interference pattern 482, a distance between the first light beam 422 and the second light beam 432 (e.g., the distance d 332 or distance d 442). In some implementations, determining, based on the interference pattern, the distance between the first light beam 422 and the second light beam 432, includes determining a spacing between peaks of fringes among the plurality of fringes (e.g., between peaks of the first fringe 484 and the second fringe 486), wherein the distance between the first light beam 422 and the second light beam 432 is a function of the spacing between the peaks of the fringes.

In some implementations, determining the position of the first location relative to the second location based on the interference pattern includes determining, based on the interference pattern, a relative angle between the first light beam 422 and the second light beam 432. Further, determining, based on the interference pattern, the distance between the first light beam 422 and the second light beam 432, includes determining a spacing between peaks of fringes among the plurality of fringes (e.g., between peaks of the first fringe 484 and the second fringe 486), wherein the distance between the first light beam 422 and the second light beam 432 is a function of the spacing between the peaks of the fringes and the relative angle between the first light beam 422 and the second light beam 432.

In some implementations, determining the position of the first location relative to the second location based on the interference pattern includes determining, based on the interference pattern, an error parameter associated with a distance between a beam waist associated with one of the first light beam 422 and the second light beam 432 and a focal plane of an image sensor to which the first light beam 422 and the second light beam 432 are directed (e.g., interference plane 480 of sensor 440). Further, determining, based on the interference pattern, the distance between the first light beam 422 and the second light beam 432, includes determining a spacing between peaks of fringes among the plurality of fringes (e.g., between peaks of the first fringe 484 and the second fringe 486), wherein the distance between the first light beam 422 and the second light beam 432 is a function of the spacing between the peaks of the fringes and the error parameter (and in some cases also the relative angle between the first light beam 422 and the second light beam 432).

At operation 1308, the method 1300 includes aligning the semiconductor optical device in a second alignment position within the LIDAR sensor system, based on the position of the first location relative to the second location. For example, the alignment device 450 may be configured to align the semiconductor optical device 410 in the second alignment position based on the position of the first location relative to the second location by orienting the semiconductor optical device 410 until the position of the first location relative to the second location is within a threshold tolerance range of a particular distance between the first location and the second location (e.g., within about ±10 μm of a particular distance of 100 μm, within about ±5 μm of a particular distance of 100 μm, within about ±1 μm of a particular distance of 100 μm, etc.). For example, the alignment device 450 can include one or more grippers to adjust or align a component in the LIDAR system based on real-time feedback associated with the measurement obtained with respect to the semiconductor optical device 410.

The method 1300 of FIG. 13 can be used as a validation method during manufacturing and validating that the semiconductor optical device is manufactured according to specified requirements. The method 1300 of FIG. 13 can also be used as a form of active feedback for aligning the semiconductor optical device in an optical package (e.g., for a LIDAR sensor system). Further, the method 1300 of FIG. 13 can also be used for validating that the final optical package is manufactured within specified requirements.

Figure 14:
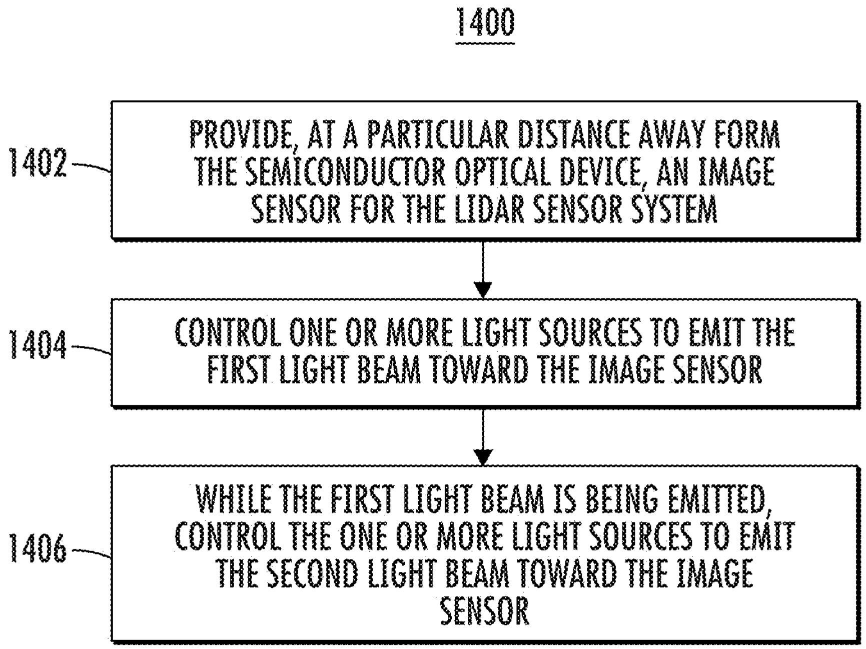

FIG. 14 is a flow diagram of an example, non-limiting computer-implemented method, according to one or more example embodiments of the disclosure.

The flow diagram of FIG. 14 illustrates a method 1400 for manufacturing a semiconductor-based LIDAR sensor system for a vehicle, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Referring to FIG. 14, at operation 1402, the method 1400 includes obtaining the interference pattern described with respect to FIG. 13, by providing, at a particular distance away from the semiconductor optical device, an image sensor for the LIDAR sensor system. For example, the image sensor may correspond to the sensor 440 of FIG. 4A. For example, the semiconductor optical device may correspond to the semiconductor optical device 300 of FIGS. 3A-3B or the semiconductor optical device 410 of FIG. 4A. The LIDAR sensor system may correspond to the LIDAR system 200 of FIG. 2, the LIDAR system 350 of FIG. 3B, or the alignment system 400 of FIG. 4 which can include components of the LIDAR system 200 or the LIDAR system 350. In some implementations, the particular distance may be about 50 mm, about 100 mm, about 200 mm, etc. For example, the particular distance may correspond to a distance between a focal plane of the image sensor and a focal plane of the semiconductor optical device.

At operation 1404, the method 1400 includes obtaining the interference pattern described with respect to FIG. 13, by controlling one or more light sources to emit the first light beam toward the image sensor, wherein the first light beam passes through the semiconductor optical device at a first location. For example, the one or more light sources may correspond to one of the light sources depicted in FIG. 4A (e.g., first light source 420 or second light source 430). In some implementations, when there are a plurality of semiconductor optical devices a first light source may emit a first light beam to a first semiconductor optical device. For example, the first light beam may pass through the semiconductor optical device at the first location (e.g., the third location 318 shown in FIG. 3A).

At operation 1406, the method 1400 includes obtaining the interference pattern described with respect to FIG. 13, by, while the first light beam is being emitted, controlling the one or more light sources to emit the second light beam toward the image sensor, wherein the second light beam passes through the semiconductor optical device at a second location. For example, the one or more light sources may correspond to one of the light sources depicted in FIG. 4A (e.g., first light source 420 or second light source 430). In some implementations, when there are a plurality of semiconductor optical devices a second light source may emit a second light beam to a second semiconductor optical device. For example, the second light beam may pass through the semiconductor optical device at the second location (e.g., the fourth location 328 shown in FIG. 3A). For example, the image sensor may be configured to analyze the first light beam and the second light beam to generate or obtain the interference pattern.

Figure 15:
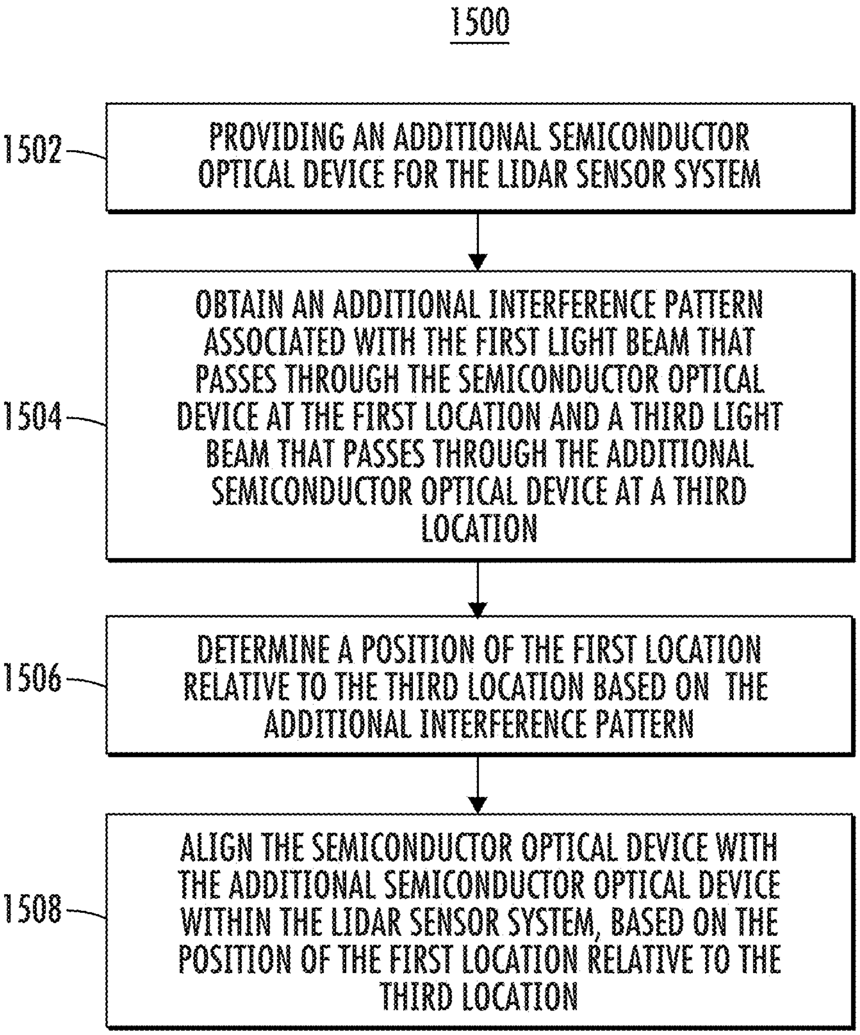

FIG. 15 is a flow diagram of an example, non-limiting computer-implemented method, according to one or more example embodiments of the disclosure.

The flow diagram of FIG. 15 illustrates a method 1500 for manufacturing a semiconductor-based LIDAR sensor system for a vehicle, according to some implementations of the disclosure. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 1500 may be an extension of the method of FIG. 13. However, in some implementations the method 1500 may be a standalone method to determine relative positions of light beams between two different semiconductor optical devices. Referring to FIG. 15, at operation 1502, the method 1500 includes providing an additional semiconductor optical device for the LIDAR sensor system. For example, the additional semiconductor optical device may correspond to the semiconductor optical device 300 of FIGS. 3A-3B or the semiconductor optical device 410 of FIG. 4A. For example, the additional semiconductor optical device may be provided adjacent to (or some spaced apart distance from) another semiconductor optical device (e.g., in a horizontal or vertical plane). The LIDAR sensor system may correspond to the LIDAR system 200 of FIG. 2, the LIDAR system 350 of FIG. 3B, or the alignment system 400 of FIG. 4 which can include components of the LIDAR system 200 or the LIDAR system 350.

At operation 1504, the method 1500 includes obtaining an additional interference pattern associated with the first light beam that passes through the semiconductor optical device at the first location and a third light beam that passes through the additional semiconductor optical device at a third location. For example, the additional interference pattern may be obtained in a manner similar to that described with respect to FIGS. 4A-4C. For example, the alignment system 400 may be configured to generate an interference pattern based on a first light beam emitted toward a sensor (e.g., sensor 440) from a first semiconductor optical device (e.g., the first semiconductor optical device 491) and a second light beam (the third light beam in the method of FIG. 15) emitted toward the sensor (e.g., sensor 440) from a second semiconductor optical device (e.g., from the fourth semiconductor optical device 494), which can be used to determine a distance between the first and second light beams (e.g., distance d1 as illustrated in FIG. 4C). That is, the alignment system 400 may be configured to obtain an additional interference pattern associated with a first light beam that passes through a first semiconductor optical device and a second light beam that passes through a second semiconductor optical device and determine a position of the first light beam relative to the second light beam, based on the additional interference pattern. For example, in some implementations the first light beam may pass through the semiconductor optical device at the first location (e.g., the third location 318 shown in FIG. 3A) and the second light beam (the third light beam in the method of FIG. 15) may pass through the second (additional) semiconductor optical device at a third location (e.g., the third location 318 shown in FIG. 3A). For example, in some implementations the first light beam may pass through the semiconductor optical device at the first location (e.g., the fourth location 328 shown in FIG. 3A) and the second light beam may pass through the second (additional) semiconductor optical device at the third location (e.g., the fourth location 328 shown in FIG. 3A).

At operation 1506, the method 1500 includes determining a position of the first location relative to the third location based on the additional interference pattern. For example, the one or more light sources may correspond to one of the light sources depicted in FIG. 4A (e.g., first light source 420 or second light source 430). For example, the alignment system 400 may be configured to determine a position of the first location (which is associated with the first light beam of a first semiconductor optical device) relative to the third location (which is associated with the third light beam of a second or additional semiconductor optical device) based on the interference pattern. For example, the alignment system 400 may be configured to determine the position of the first location relative to the third location (e.g., the distances d1, d2, d3 in FIG. 4C) based on the interference pattern by determining, based on fringe characteristics from the interference pattern, a distance between the first light beam and the third light beam (e.g., the distances d1, d2, d3 in FIG. 4C).

At operation 1508, the method 1500 includes aligning the semiconductor optical device with the additional semiconductor optical device within the LIDAR sensor system, based on the position of the first location relative to the third location. For example, the alignment device 450 may be configured to align the semiconductor optical device (e.g., first semiconductor optical device 491) with the additional semiconductor optical device (e.g., fourth semiconductor optical device 494) in the second alignment position based on the position of the first location relative to the third location by orienting one or more of the semiconductor optical devices until the position of the first location relative to the third location is within a threshold tolerance range of a particular distance between the first location and the third location (e.g., within about ±10 μm of a particular distance of 300 μm, within about ±5 μm of a particular distance of 500 μm, within about ±1 μm of a particular distance of 1000 μm, etc.). For example, the alignment device 450 can include one or more grippers to adjust or align a component in the LIDAR system based on real-time feedback associated with the measurement obtained with respect to the semiconductor optical devices.

The method 1500 of FIG. 15 can be used as a validation method during manufacturing and validating that the semiconductor optical devices are manufactured according to specified requirements. The method 1500 of FIG. 15 can also be used as a form of active feedback for aligning the semiconductor optical devices in an optical package (e.g., for a LIDAR sensor system). Further, the method 1500 of FIG. 15 can also be used for validating that the final optical package is manufactured within specified requirements.

Figure 16:
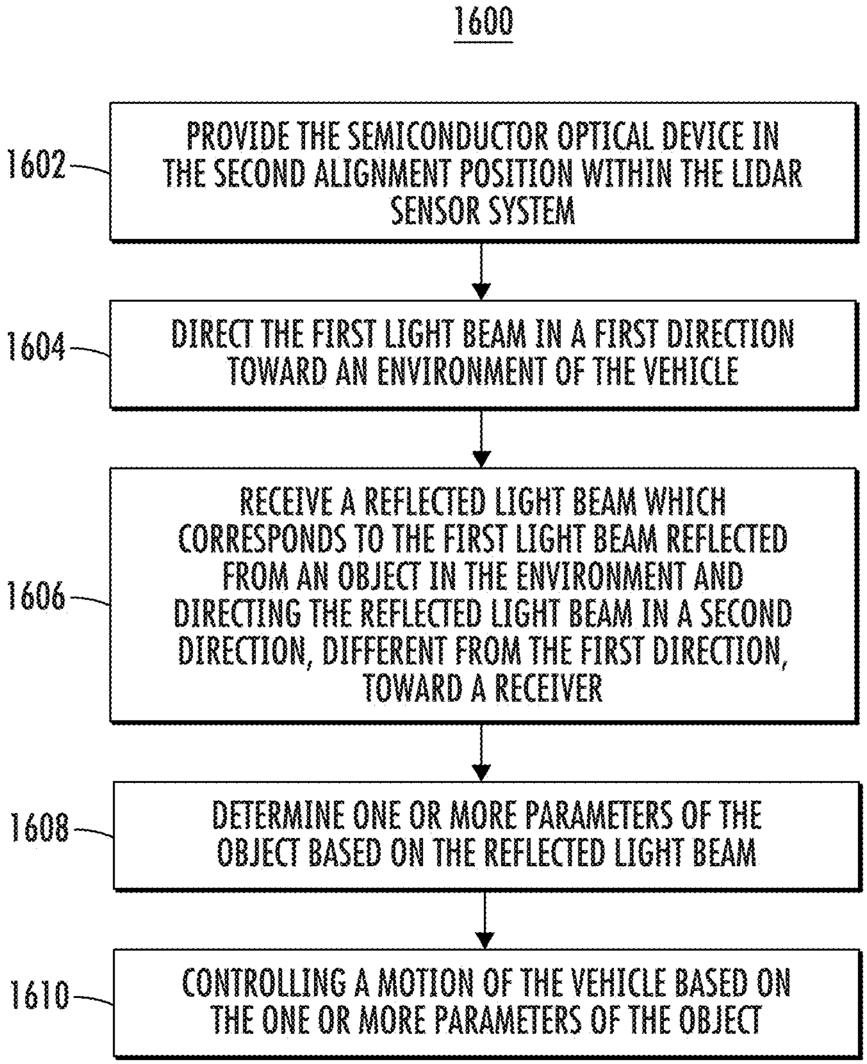

FIG. 16 is a flow chart of a process for using a semiconductor optical device to control a vehicle, according to one or more example embodiments of the disclosure.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 1600 may be an extension of the method of FIG. 13. However, in some implementations the method 1600 may be a standalone method (e.g., for testing or implementing a semiconductor optical device in a LIDAR system and/or for controlling a vehicle).

Referring to FIG. 16, at operation 1602, the method 1600 includes providing the semiconductor optical device in the second alignment position where the semiconductor optical device is properly aligned (positioned) within the LIDAR sensor system. For example, the semiconductor optical device may be provided in the second alignment position after performing the operations of FIG. 13.

At operation 1604, the method 1600 includes directing the first light beam in a first direction toward an environment of the vehicle. For example, the first light beam may correspond to outgoing light 319 in FIG. 3B.

At operation 1606, the method 1600 includes receiving a reflected light beam which corresponds to the first light beam reflected from an object in the environment and directing the reflected light beam in a second direction, different from the first direction, toward a receiver. For example, the reflected light beam may correspond to incoming light 329 in FIG. 3B which has been reflected off object 362 which may be in an environment of the vehicle. Further, the incoming light 329 is directed toward receiver 368 in FIG. 3B.

At operation 1608, the method 1600 includes determining one or more parameters of the object based on the reflected light beam. For example, as described herein, one or more of the parameters of the object (e.g., object 362) can be determined based on sensor data collected by the LIDAR sensor system. For example, the LIDAR sensor system may output sensor data 104 which can be processed by one or more sub-control system(s) 101 shown in FIG. 1 to determine the parameters of the object. For example, the parameters of the object can include map or location data associated with the object, distance information associated with the object, identification or classification information associated with the object, motion information associated with the object, etc.

At operation 1610, the method 1600 includes controlling a motion of the vehicle based on the one or more parameters of the object. For example, as described herein, one or more of the sub-control system(s) 101 shown in FIG. 1 can be implemented to control a motion of the vehicle based on the one or more parameters of the object (e.g., by generating a motion plan, by selecting a motion plan, by controlling braking, acceleration, and/or steering components of the vehicle, etc.).

The foregoing describes the technology of this disclosure within the context of a LIDAR system and an autonomous vehicle for example purposes only. As described herein, the technology described herein is not limited to a LIDAR system or an autonomous vehicle and can be implemented for or within other systems, autonomous platforms, and other computing systems.

What is claimed is:

1. A method for manufacturing a semiconductor-based LIDAR sensor system for a vehicle, the method comprising:

providing a semiconductor optical device in a first alignment position within the LIDAR sensor system;

obtaining an interference pattern associated with a first light beam that passes through the semiconductor optical device at a first location and a second light beam that passes through the semiconductor optical device at a second location;

determining a position of the first location relative to the second location based on the interference pattern; and aligning the semiconductor optical device in a second alignment position within the LIDAR sensor system, based on the position of the first location relative to the second location.

2. The method of claim 1, wherein the interference pattern is indicative of an intensity of interference between the first light beam and the second light beam as the first light beam and the second light beam propagate.

3. The method of claim 1, wherein determining the position of the first location relative to the second location based on the interference pattern comprises:

determining, based on the interference pattern, a distance between the first light beam and the second light beam.

4. The method of claim 3, wherein:

the interference pattern includes a plurality of fringes, and determining, based on the interference pattern, the distance between the first light beam and the second light beam, comprises:

determining a spacing between peaks of fringes among the plurality of fringes, wherein the distance between the first light beam and the second light beam is a function of the spacing between the peaks of the fringes.

5. The method of claim 4, wherein the distance between the first light beam and the second light beam is between about 10 μm to about 1 mm.

6. The method of claim 1, wherein determining the position of the first location relative to the second location based on the interference pattern comprises:

determining, based on the interference pattern, a relative angle between the first light beam and the second light beam.

7. The method of claim 6, wherein:

the interference pattern includes a plurality of fringes, and determining, based on the interference pattern, a distance between the first light beam and the second light beam by determining a spacing between peaks of fringes among the plurality of fringes, wherein the distance between the first light beam and the second light beam is a function of the spacing between the peaks of the fringes and the relative angle between the first light beam and the second light beam.

8. The method of claim 1, wherein determining the position of the first location relative to the second location based on the interference pattern comprises:

determining a distance between a beam waist associated with one of the first light beam and the second light beam and a focal plane of an image sensor to which the first light beam and the second light beam are directed.

9. The method of claim 8, wherein:

the interference pattern includes a plurality of fringes, and determining, based on the interference pattern, the distance between the first light beam and the second light beam, comprises:

determining a spacing between peaks of fringes among the plurality of fringes, wherein the distance between the first light beam and the second light beam is a function of the spacing between the peaks of the fringes and the distance between the beam waist and the focal plane of the image sensor.

10. The method of claim 1, wherein:

the first alignment position and the second alignment position of the semiconductor optical device are different; and aligning the semiconductor optical device in the second alignment position based on the position of the first location relative to the second location comprises implementing an alignment system to orient the semiconductor optical device until the position of the first location relative to the second location is within a threshold tolerance range of a particular distance between the first location and the second location.

11. The method of claim 1, wherein:

the first alignment position and the second alignment position of the semiconductor optical device are substantially the same; and aligning the semiconductor optical device in the second alignment position comprises determining that a distance between the first location and the second location is within a particular threshold value of a particular target distance.

12. The method of claim 1, wherein the semiconductor optical device includes a microlens array.

13. The method of claim 12, wherein:

the microlens array includes a first portion and a second portion, the first portion includes a first mirror configured to reflect the first light beam in a first direction toward an environment of the vehicle, and the second portion includes a second mirror configured to reflect the second light beam in a second direction, different from the first direction, toward a receiver.

14. The method of claim 13, wherein:

the first portion and the second portion are joined together at a third location between the first location and the second location, and the first mirror intersects with the second mirror at the third location to form a notch between the first portion and the second portion.

15. The method of claim 1, wherein obtaining the interference pattern comprises:

providing, at a particular distance away from the semiconductor optical device, an image sensor, controlling one or more light sources to emit the first light beam toward the image sensor, wherein the first light beam passes through the semiconductor optical device at the first location, and while the first light beam is being emitted, controlling the one or more light sources to emit the second light beam toward the image sensor, wherein the second light beam passes through the semiconductor optical device at the second location.

16. The method of claim 15, wherein the first light beam and the second light beam are coherent.

17. The method of claim 15, wherein the one or more light sources are integrated into the semiconductor-based LIDAR sensor system.

18. The method of claim 1, further comprising:

providing an additional semiconductor optical device for the LIDAR sensor system;

obtaining an additional interference pattern associated with the first light beam that passes through the semiconductor optical device at the first location and a third light beam that passes through the additional semiconductor optical device at a third location;

determining a position of the first location relative to the third location based on the additional interference pattern; and aligning the semiconductor optical device with the additional semiconductor optical device within the LIDAR sensor system, based on the position of the first location relative to the third location.

19. An alignment system for manufacturing a semiconductor-based LIDAR sensor system for a vehicle, the alignment system comprising:

a semiconductor optical device provided in a first alignment position within the LIDAR sensor system;

a sensor configured to obtain an interference pattern associated with a first light beam that passes through the semiconductor optical device at a first location and a second light beam that passes through the semiconductor optical device at a second location, and to determine a position of the first location relative to the second location based on the interference pattern; and an alignment device configured to align the semiconductor optical device in a second alignment position within the LIDAR sensor system, based on the position of the first location relative to the second location.

20. The alignment system of claim 19, wherein:

the alignment device is configured to align the semiconductor optical device in the second alignment position based on the position of the first location relative to the second location by adjusting the semiconductor optical device until the position of the first location relative to the second location is within a threshold tolerance range of a particular distance between the first location and the second location.

21. The alignment system of claim 19, wherein a focal plane of the sensor is provided a particular distance from a focal plane of the semiconductor optical device, and the alignment system further comprises one or more light sources configured to:

emit the first light beam toward the sensor, wherein the first light beam passes through the semiconductor optical device at the first location, and while the first light beam is being emitted, emit the second light beam toward the sensor, wherein the second light beam passes through the semiconductor optical device at the second location.

* * * * *